United States Patent
Moriya et al.

(10) Patent No.: US 6,435,149 B2
(45) Date of Patent: Aug. 20, 2002

(54) VARIABLE PERFORMANCE VALVE TRAIN HAVING THREE-DIMENSIONAL CAM

(75) Inventors: Yoshihito Moriya, Nagoya; Hideo Nagaosa, Nishikamo-gun; Shuuji Nakano, Nagoya; Shinichiro Kikuoka, Nishikamo-gun, all of (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/963,561

(22) Filed: Sep. 27, 2001

Related U.S. Application Data

(62) Division of application No. 09/394,529, filed on Sep. 10, 1999, now Pat. No. 6,318,313.

(30) Foreign Application Priority Data

| Oct. 6, 1998 | (JP) | 10-284022 |
| Oct. 22, 1998 | (JP) | 10-301382 |

(51) Int. Cl.⁷ .............. F01L 13/00; F01L 1/34
(52) U.S. Cl. .................. 123/90.18; 123/90.15; 123/198 D
(58) Field of Search .......... 123/90.15, 90.16, 123/90.17, 90.18, 198 D

(56) References Cited

U.S. PATENT DOCUMENTS

| 4,517,936 A | 5/1985 | Burgio di Aragona | 123/90.5 |
| 4,693,214 A | 9/1987 | Titolo | 123/90.18 |
| 5,537,961 A * | 7/1996 | Shigeru et al. | 123/90.15 |
| 5,738,053 A | 4/1998 | Kato | 123/90.15 |

FOREIGN PATENT DOCUMENTS

| JP | 5-125966 | 5/1993 |
| JP | 6-323115 | 11/1994 |
| JP | 8-177434 | 7/1996 |
| JP | 9-268906 | 10/1997 |
| JP | 10-184406 | 7/1998 |

OTHER PUBLICATIONS

A. Titolo, The Variable Valve Timing System—Application on a V8 Engine pp. 8–15.

* cited by examiner

Primary Examiner—Wellun Lo
(74) Attorney, Agent, or Firm—Oliff & Berridge, PLC

(57) ABSTRACT

A valve train for an internal combustion engine has a variable valve performance mechanism for changing the valve open angle of at least one set of intake valves and exhaust valves. The valve train further includes an electronic control unit (ECU) for controlling the variable valve performance mechanism and a sensor for detecting the running state of the engine. The ECU judges whether there is a malfunction in the engine based on detection signals from the sensor. If there is a malfunction in the engine, the ECU actuates the variable valve performance mechanism to decrease the valve overlap thereby performing a failsafe. The ECU also advances the closing timing of the intake valves. Alternatively, the ECU retards the opening timing of the exhaust valves.

3 Claims, 38 Drawing Sheets

Fig.4
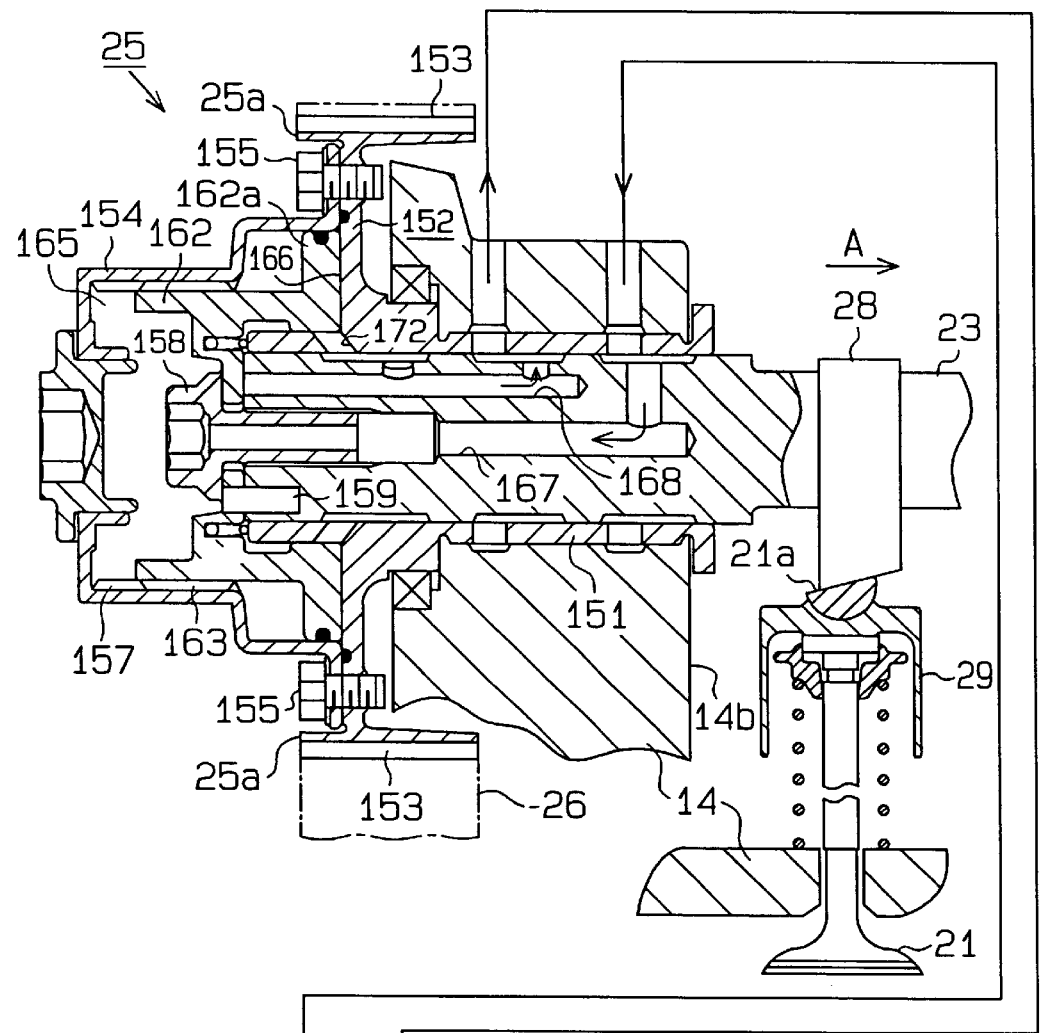
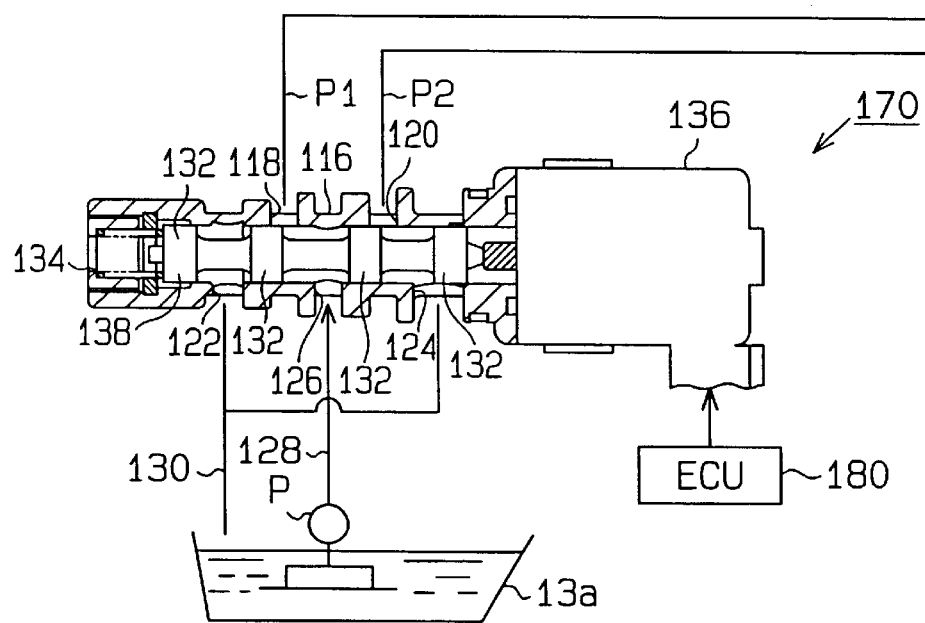

Fig.33
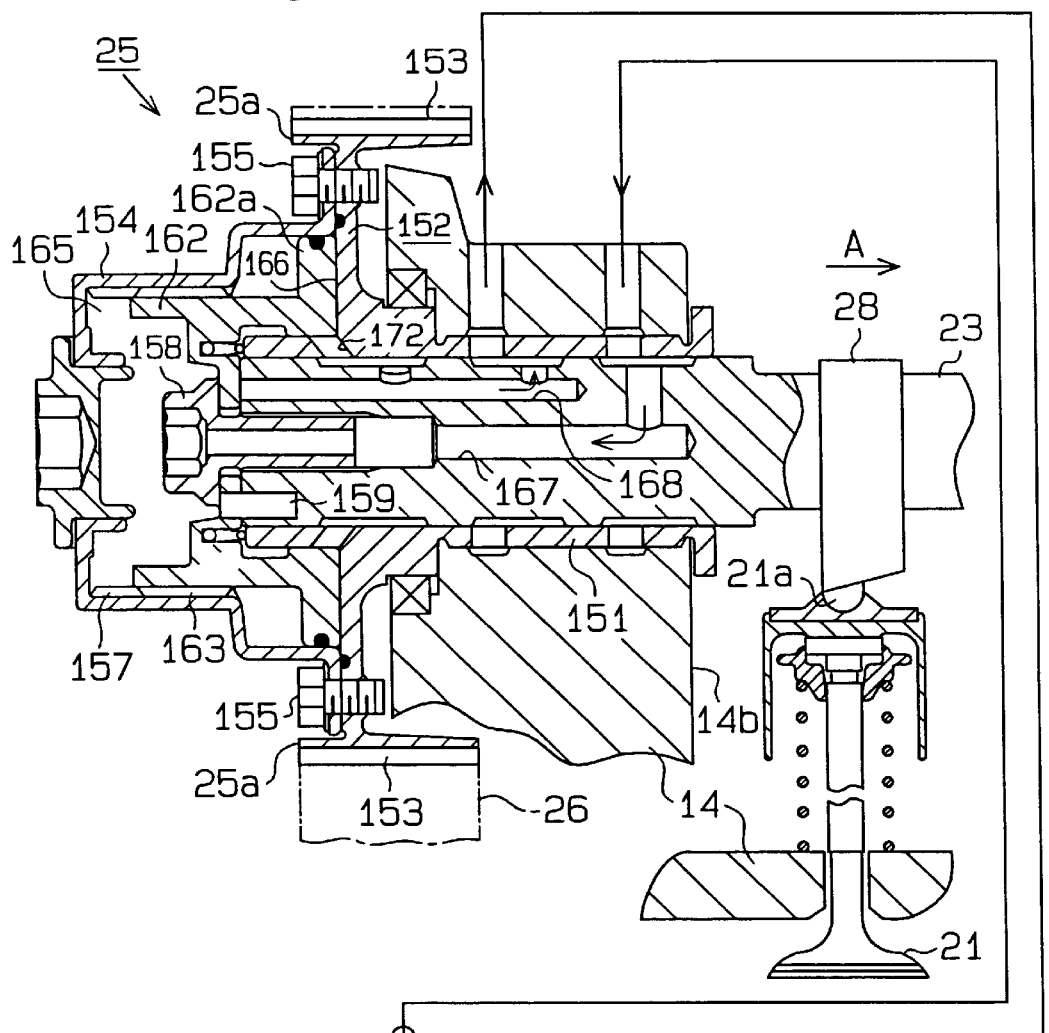
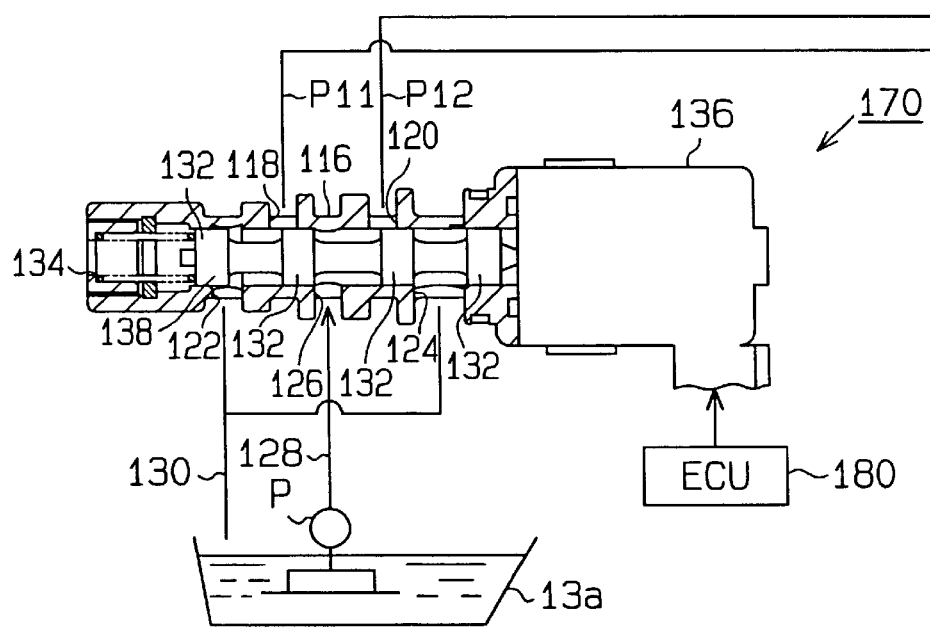

Fig.35
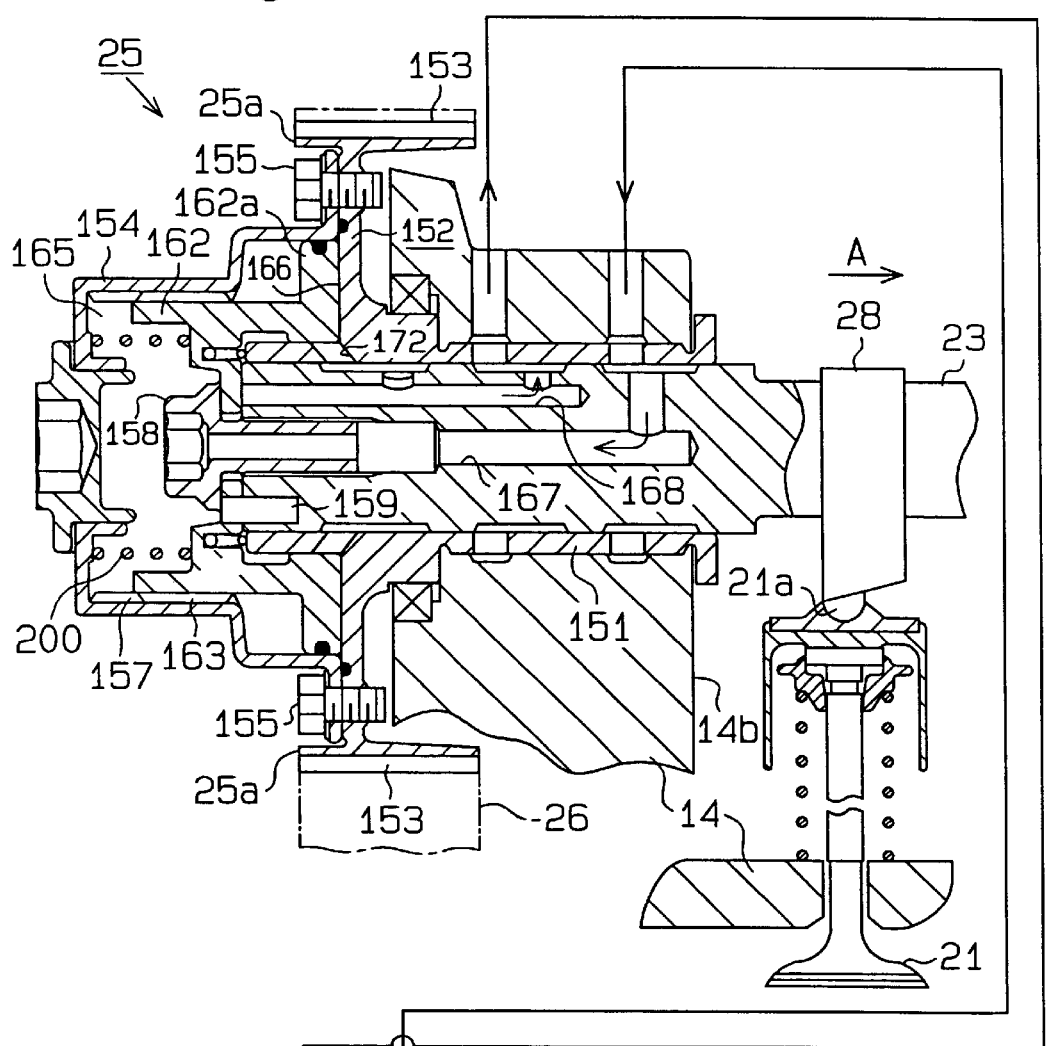
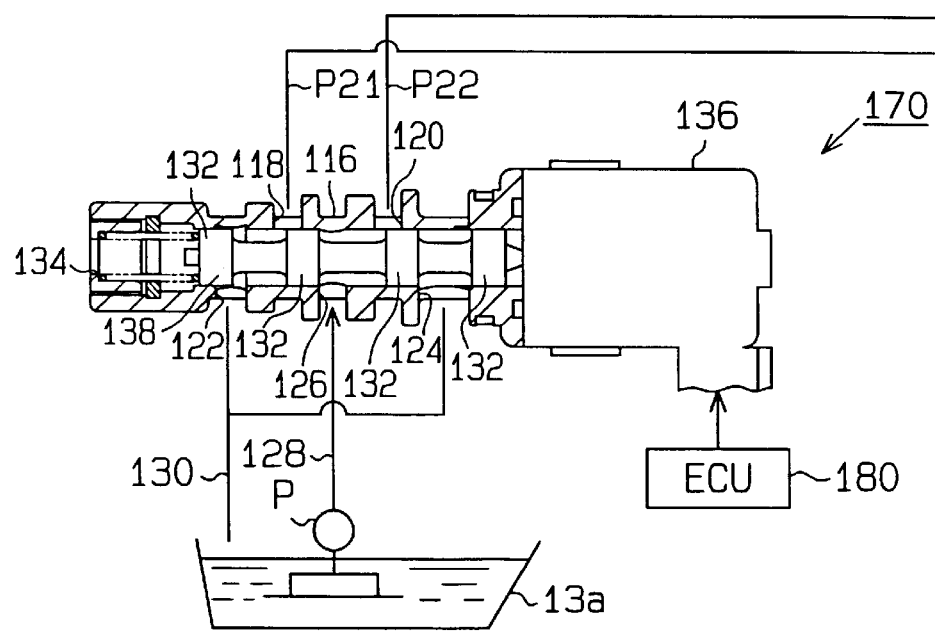

VARIABLE PERFORMANCE VALVE TRAIN HAVING THREE-DIMENSIONAL CAM

This is a Division of application Ser. No. 09/394,529 filed Sep. 10, 1999, now U.S. Pat. No. 6,318,313. The entire disclosure of the prior application(s) is hereby incorporated by reference herein in its entirety.

BACKGROUND OF THE INVENTION

The present invention relates to a variable performance valve train used in internal combustion engines. More particularly, the present invention pertains to a variable performance valve train having three-dimensional cams, the profile of which continuously changes along the axis of a camshaft.

Japanese Unexamined Patent Publication No. 5-125966 discloses a first prior art apparatus, which includes a variable valve lift mechanism. The variable valve lift mechanism includes intake and exhaust valves, which are driven by camshafts, and low speed and high speed cams for driving the intake valves or the exhaust valves. The mechanism varies the valve lift, or the valve open angle, of the intake valves or the exhaust valves. In this specification, the valve open angle refers to an angle of rotation of a crankshaft during which an intake valve or an exhaust valve is open.

When there is a malfunction in the control of a throttle valve, the mechanism of Japanese Unexamined Patent Publication No. 5-125966 selects a set of cams that will decrease the engine power. Specifically, the mechanism uses either high speed cams or low speed cams such that the vehicle speed is reduced.

Instead of having two types of cams, a variable performance valve train according to a second prior art apparatus has three-dimensional cams, the profile of which continuously changes along the axis of a camshaft. However, unlike the prior art apparatus of Japanese Unexamined Patent Publication No. 5-125966, a valve train having three-dimensional cams cannot employ the valve switching control and fail-safe control for decreasing the engine power.

For example, if the mechanism having the three-dimensional cams simply decreases engine power for performing fail-safe control, engine starting is hindered or engine speed stability deteriorates.

A valve train according to a third prior art apparatus disclosed in Japanese Unexamined Patent Publication 8-177434 includes the high speed and low speed cams of Publication No. 5-125966 and a variable valve timing mechanism. The variable valve timing mechanism adjusts the rotational phase of the camshaft.

When either the variable valve lift mechanism or the variable valve timing mechanism malfunctions, the variable valve lift mechanism uses the low speed cams, and the variable valve timing mechanism retards the rotational phase of the camshaft. This prevents the intake valves from interfering with the pistons and the exhaust valves.

A malfunction of the variable valve lift mechanism could be either a malfunction of the low speed cams or a malfunction of the high speed cams. In order to perform fail-safe control, different programs must be prepared for a malfunction of the low speed cams and for a malfunction of the high speed cams. The two fail-safe controls increase the time and effort required to make the programs and increase the required memory capacity for storing the programs.

If the variable valve lift mechanism malfunctions when the high speed cams are being used, the mechanism may not be able to switch to the low speed cams. In this case, engine starting and engine speed stability will deteriorate.

SUMMARY OF THE INVENTION

Accordingly, it is an objective of the present invention to provide a variable performance valve train that facilitates engine starting and stabilizes the engine speed when there is a malfunction thereby making it easier for the driver take steps to correct the malfunction.

To achieve the above objective, the present invention provides a valve train for an internal combustion engine, comprising: a variable valve performance mechanism for continuously changing the valve open angle of at least one of an intake valve and an exhaust valve; a controller for controlling the variable valve performance mechanism; a sensor for detecting the running state of the engine; and a judging device for judging whether there is a malfunction in the engine based on a detection signal of the sensor, wherein, when the judging device judges that there is a malfunction in the engine, the controller actuates the variable valve performance mechanism to decrease valve overlap.

The present invention further provides a valve train for an internal combustion engine, comprising: a variable valve performance mechanism for continuously changing the valve open angle of an intake valve; a controller for controlling the variable valve performance mechanism; a sensor for detecting the running state of the engine; and a judging device for judging whether there is a malfunction in the engine based on a detection signal of the sensor, wherein, when the judging device judges that there is a malfunction in the engine, the controller actuates the variable valve performance mechanism to advance the closing timing of the intake valve.

The present invention provides a valve train for an internal combustion engine, comprising: a variable valve performance mechanism for continuously changing the valve open angle of an exhaust valve; a controller for controlling the variable valve performance mechanism; a sensor for detecting the running state of the engine; and a judging device for judging whether there is a malfunction in the engine based on a detection signal of the sensor, wherein when the judging device judges that there is a malfunction in the engine, the controller actuates the variable valve performance mechanism to retard the opening timing of the exhaust valve.

The present invention further provides a method for changing the valve performance of at least one of an exhaust valve and an intake valve by using a three-dimensional cam, the method comprising: detecting the running state of an engine; judging whether the engine is running normally based on the detected running state; controlling a valve open angle based on the detected running state when the engine is judged to be running normally; and decreasing valve overlap when the engine is judged to be running abnormally.

The present invention provides a method for changing the valve performance of an intake valve by using a three-dimensional cam, the method comprising: detecting the running state of an engine; judging whether the engine is running normally based -on the detected running state; controlling a valve open angle based on the detected running state when the engine is judged to be running normally; and advancing the closing timing of the intake valve for performing a failsafe when the engine is judged to be running abnormally.

The present invention further provides a method for changing the valve performance of an exhaust valve by using a three-dimensional cam, the method comprising: detecting the running state of an engine; judging whether the engine is running normally based on the detected running state; controlling a valve open angle based on the detected running state when the engine is judged to be running normally; and advancing the closing timing of the exhaust valve when the engine is judged to be running abnormally.

The present invention provides a valve train for an internal combustion engine, comprising: an axially movable camshaft rotatably supported on the engine; a three-dimensional cam located on the camshaft to selectively open and close a valve, wherein the profile of the three-dimensional cam continuously changes in the axial direction; an actuator for axially moving the camshaft to change at least the valve lift of the valve lift and the valve timing of the valve; a fluid pressure source for generating fluid pressure to actuate the actuator; and a control valve for adjusting the position of the camshaft by controlling fluid pressure supplied to the actuator from the fluid pressure source; wherein a default position toward which the camshaft is moved when the control of fluid pressure by the control valve is stopped is the same as a default position toward which the camshaft is moved when the fluid pressure source is not supplying fluid pressure to the actuator.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4 is a diagrammatic cross-sectional view illustrating an operational state of the actuator and the control valve of FIG. 3;

FIG. 33 is a diagrammatic cross-sectional view illustrating a variable valve lift actuator and an oil control valve according to a fifteenth embodiment of the present invention;

FIG. 35 is a diagrammatic cross-sectional view illustrating a variable valve lift actuator and an oil control valve according to a seventeenth embodiment of the present invention;

DETAILED DESCRIPTION OF THE PREFERRED EMBODIMENTS

A variable performance valve train according to a first embodiment of the present invention will now be described with reference to FIGS. 1 to 7.

Figure 1:
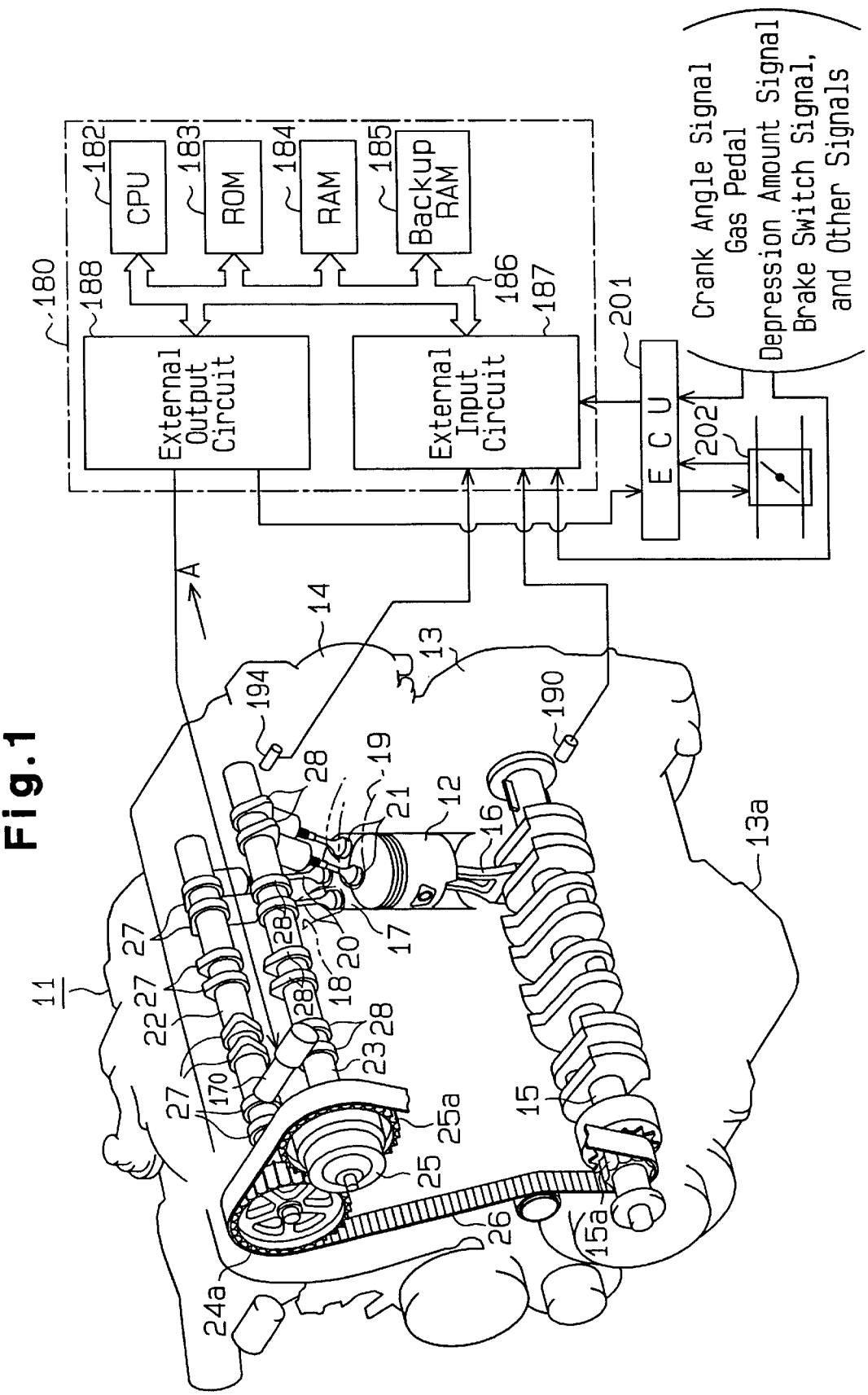
FIG. 1 is a partial perspective view and a block diagram illustrating a variable performance valve train according to a first embodiment of the present invention.

Referring to FIG. 1, an in-line four cylinder type engine 11 has a cylinder block 13, an oil pan 13a, which is located under the cylinder block 13, and a cylinder head 14, which is located on top of the cylinder block 13. Pistons 12 (only one is shown) are reciprocally accommodated in the cylinder block 13.

An output shaft, or crankshaft 15, is rotatably supported in the lower portion of the engine 11. Each piston 12 is connected to the crankshaft 15 by a connecting rod 16. The connecting rods 16 convert reciprocation of the pistons 12 into rotation of the crankshaft 15. A combustion chamber 17 is defined above each piston 12. An exhaust passage 18 and an intake passage 19 are connected to the combustion chamber 17. A pair of exhaust valves 20 selectively connect and disconnect the combustion chamber 17 with the exhaust passage 18. A pair of intake valves 21 selectively connect and disconnect the combustion chamber 17 with the intake passage 19.

An exhaust camshaft 22 and an intake camshaft 23 are rotatably supported in the cylinder head 14. The exhaust camshaft 22 and the intake camshaft 23 extend parallel to each other and to the crankshaft 15. The exhaust camshaft 22 is axially fixed. The intake camshaft 23 is axially movable.

A timing pulley 24a is fixed to a first end (left end as viewed in the drawing) of the exhaust camshaft 22. A variable valve lift actuator 25, which includes a timing pulley 25a, is fixed to a first end (left end as viewed in the drawing) of the intake camshaft 23. The variable valve lift actuator 25 axially moves the intake camshaft 23 to change the cam profile of three-dimensional intake cams 28. Accordingly, the valve open angle and the valve lift of the intake valves 21 are adjusted.

The timing pulleys 24a, 25a are connected to a timing pulley 15a fixed to the crankshaft 15 by a timing belt 26. The timing belt 26 transmits rotation of the crankshaft 15 to the exhaust and intake camshafts 22, 23. Accordingly, the exhaust and intake camshafts 22, 23 are rotated in synchronization with the crankshaft 15.

Pairs of exhaust cams 27 are located on the exhaust camshaft 22. Each pair of the exhaust cams 27 contacts a corresponding pair of valve lifters 29 located at the top of a corresponding pair of exhaust valves 20. The intake cams 28 are located on the intake camshaft 23. Each pair of intake cams 28 contacts a corresponding pair of valve lifters 29 located on the top of a corresponding pair of intake valves 21. Rotation of the exhaust camshaft 22 causes each exhaust valve 20 to selectively open and close in accordance with the profile of the associated exhaust cam 27. Likewise, rotation of the intake camshaft 23 causes each intake valve 21 to selectively open and close in accordance with the profile of the associated intake cam 28.

Figure 2:
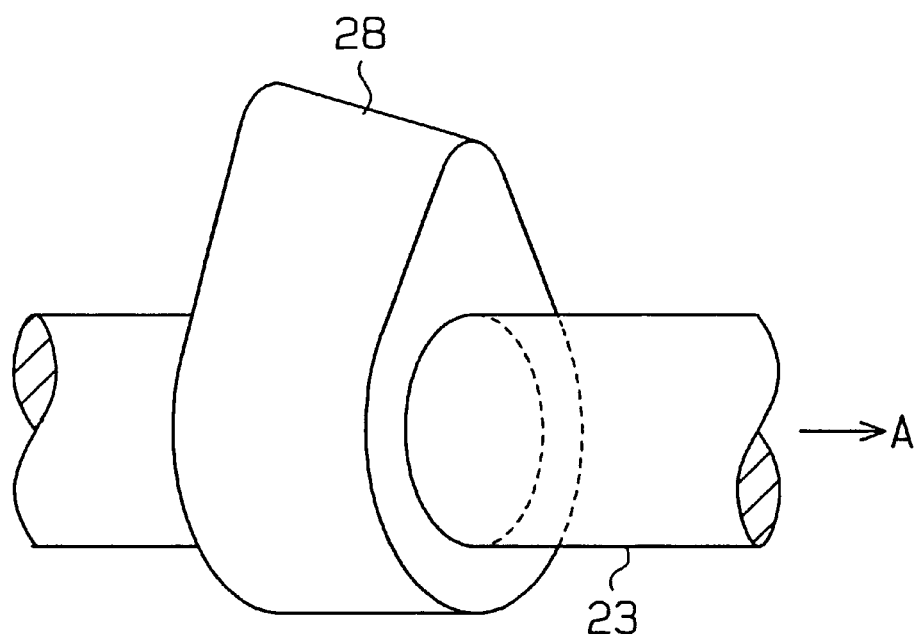
FIG. 2 is a partial perspective view illustrating a three-dimensional cam in the valve train of FIG. 1.

The profile of each exhaust cam 27 does not vary along the axis of the exhaust camshaft 22. The intake cams 28 are three-dimensional as illustrated in FIG. 2. That is, the profile of each intake cam 28 continuously changes along the axis of the intake camshaft 23.

When the intake camshaft 23 is moved in a direction indicated by arrow A, the intake cams 28 continuously increase the valve lift of the intake valves 21, which advances the opening timing of the intake valves 21 and retards the closing timing of the intake valves 21. Accordingly, the valve open angle of the intake valves 21 is gradually extended. If the intake camshaft 23 is moved in the opposite direction of arrow A, the intake cams 28 continuously decrease the valve lift of the intake valves 21, which retards the opening timing of the intake valves 21 and advances the closing timing of the intake valves 21. Accordingly, the valve open angle is gradually shortened.

Axial movement of the intake camshaft 23 continuously changes the valve open angle and the valve lift of the intake valves 21.

Next, the variable valve lift actuator 25 and an oil supply system will be described with reference to FIG. 3. The oil supply system hydraulically drives the actuator 25.

Figure 3:
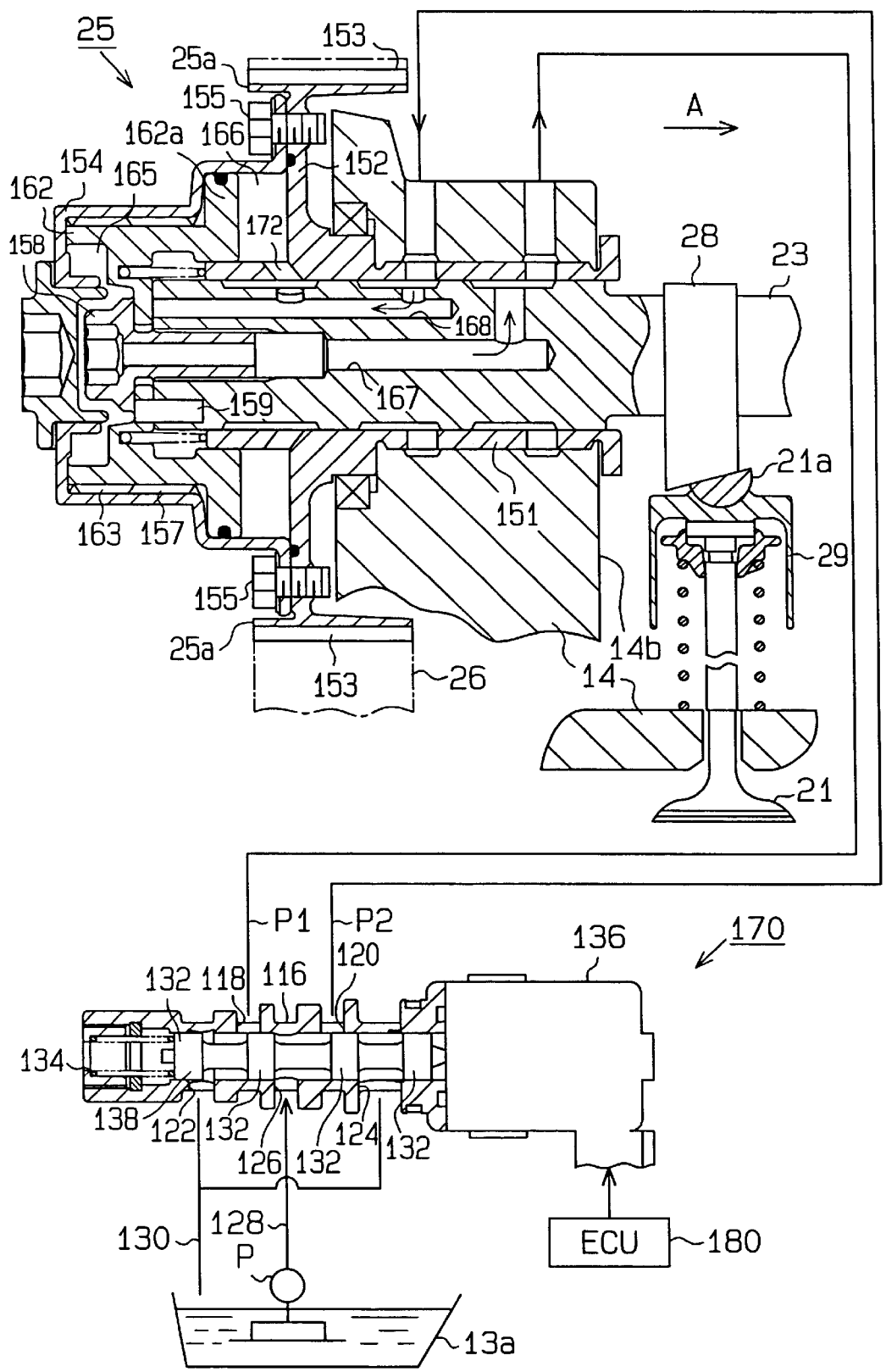
FIG. 3 is a diagrammatic cross-sectional view illustrating a variable valve lift actuator and an oil control valve in the valve train of FIG. 1.

As shown in FIG. 3, the variable valve lift actuator 25 includes the timing pulley 25a. The timing pulley 25a includes a cylindrical boss 151, a disk 152 and outer teeth 153. The boss 151 slidably supports the intake camshaft 23. The disk 152 extends radially from the boss 151. The teeth 153 are formed on the circumferential surface of the disk 152. The boss 151 is robtatably supported by a support 14b of the cylinder head 14. The intake camshaft 23 can move axially in the boss 151.

A cover 154 is secured to the pulley 25a by bolts 155 to cover the distal end of the intake camshaft 23. Inner teeth 157 are formed on the inner face of the cover 154. The inner teeth 157 extend along the axis of the intake camshaft 23 and form an internal gear.

A ring gear 162 is fastened to the distal end of the intake camshaft 23 by a hollow bolt 158 and a pin 159. Outer teeth 163 are formed on the ring gear 162. The outer teeth 163 extend along the axis of the intake camshaft 23 and form a spur gear. The outer teeth 163 mesh with the inner teeth 157. The ring gear 162 does not rotate relative to the timing pulley 25a but moves axially together with the intake camshaft 23 along the axis of the intake camshaft 23.

When the engine 11 is running, rotation of the crankshaft 15 is transmitted to the timing pulley 25a by the timing belt 26. The pulley 25a integrally rotates the intake camshaft 23. When rotated, the intake camshaft 23 actuates the intake valves 21 by means of the valve lifters 29 and the cam followers 21a, which are pivotally supported by the valve lifters 29.

When the ring gear 162 is hydraulically moved rightward (the direction of arrow A) by the oil supply system, so is the intake camshaft 23 as shown in FIG. 4. Accordingly, the cam follower 21a of each intake valve 21 is moved to the left portion (as viewed in FIG. 3) of the corresponding intake cam 28, which has a larger profile. Thus, the valve lift and the valve open angle of the intake valve 21 are increased. That is, the opening timing of the intake valves 21 is advanced and the closing timing of the valves 21 is retarded.

As shown in FIG. 3, when the ring gear 162 is moved leftward (in the opposite direction of arrow A), so is the camshaft 23. Accordingly, the cam follower 21a of each intake valve 21 is moved to the right portion of the corresponding intake cam 28, which has a smaller cam profile. Thus, the valve lift and the valve open angle of the intake valve 21 are decreased. That is, the opening timing of the intake valve 21 is retarded and the closing timing of the intake valve 21 is advanced.

The oil supply system, which hydraulically actuates the ring gear 162, will now be described.

The ring gear 162 has a radially extending flange 162a, which forms a piston. The ring gear 162 slidably contacts the inner surface of the cover 154 and defines first and second oil pressure chambers 165, 166. First and second oil conduits 167 and 168 are formed in the intake camshaft 23. The first and second oil conduits 167, 168 are connected to the first and second oil chambers 165, 166, respectively.

The first oil conduit 167 is connected to the first oil chamber 165 by the interior of the hollow bolt 158 and extends through the cylinder head 14 to an oil control valve (OCV) 170. The second oil conduit 168 is connected to the second oil chamber 166 through the boss 151 of the timing pulley 25a and an oil hole 172, and extends through the cylinder head 14 to the OCV 170.

A supply passage 128 and a drain passage 130 are connected to the OCV 170. The supply passage 128 is connected to an oil pan 13a via an oil pump P. The drain passage 130 is directly connected to the oil pan 13a.

The OCV 170 has a casing 116. The casing 116 has first and second oil ports 118, 120, first and second drain ports 122, 124 and a supply port 126. The first oil port 118 is connected to a passage P1 and the second oil port 120 is connected to a passage P2. The supply port 126 is connected to a supply passage 128. The first and second drain ports 122, 124 are connected to a drain passage 130. Oil supplied by the oil pump P is conducted to the actuator 25 via the supply passage 128 and the OCV 170. Oil from the actuator 25 is drained to the oil pan 13a via the OCV 170 and the drain passage 130. The OCV 170 includes a spool 138, a coil spring 134 and an electromagnetic solenoid 136. The spool 138 has four valve bodies 132. The coil spring 134 urges the spool 138 axially toward the solenoid 136. The solenoid 136 moves the spool 138 axially leftward (as viewed in FIG. 3).

When the solenoid 136 is de-excited, the force of the spring 134 displaces the spool 138 to the rightmost position in the casing 116 as illustrated in FIG. 3. This communicates the first oil port 118 with the first drain port 122 and the second oil port 120 with the supply port 126. In this state, oil in the oil pan 13a is supplied to the second oil pressure chamber 166 via the supply passage 128, the OCV 170, the passage P2, the second oil conduit 168 and the oil hole 172. Also, oil in the first oil pressure chamber 165 is drained to the oil pan 13a via the first oil conduit 167, the oil passage P1, the OCV 170 and the drain passage 130. As a result, the ring gear 162 and the intake camshaft 23 are moved leftward and each cam follower 21a contacts the small profile portion (low valve lift portion) of the associated intake cam 28. This decreases the valve lift and the valve open angle of the intake valves 21. The valve performance of the exhaust and intake valves 20, 21, which includes the valve lift of the valves 20, 21, corresponding to FIG. 3, is shown in FIG. 6(A). As shown in FIG. 6(A), there is no valve overlap of the valves 20, 21.

When excited, the solenoid 136 displaces the spool 138 to the leftmost position in the casing 116 against the force of the coil spring 134 as shown in FIG. 4. This communicates the second port 120 with the second drain port 124 and the first port 118 with the supply port 126. In this state, oil in the oil pan 13a is supplied to the first oil pressure chamber 165 via the supply passage 128, the OCV 170, the passage P1 and the first conduit 167. Oil in the second pressure chamber 166 is drained to the oil pan 13a via the oil hole 172, the second conduit 168, the passage P2, the OCV 170 and the drain passage 130. As a result, the ring gear 162 and the intake camshaft 23 are moved in a direction of arrow A, which causes each cam follower 21a to contact the large profile portion (high valve lift portion) of the associated intake cam 28. Accordingly, the valve lift and the valve open angle of the intake valves 21 are increased. The valve performance of the exhaust and intake valves 20, 21, which includes the valve lift of the valves 20, 21, corresponding to FIG. 4, is shown in FIG. 6(B). FIG. 6(B) shows a maximum valve overlap of the valves 20, 21.

Figure 5:
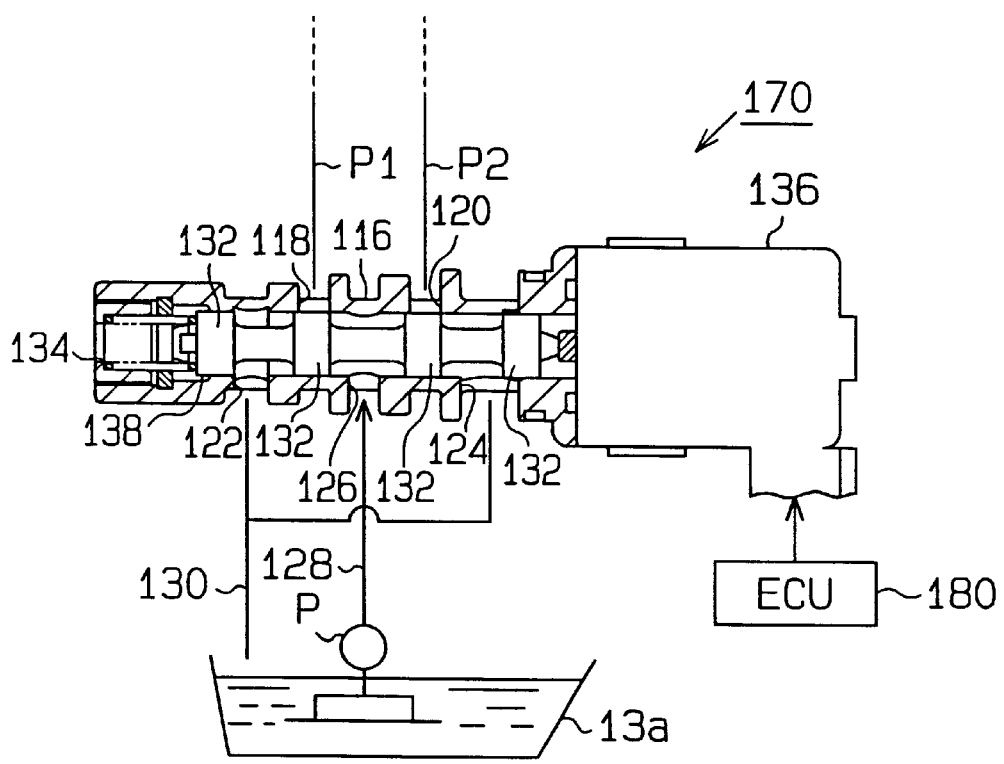
FIG. 5 is a diagrammatic cross-sectional view illustrating an operational state of the oil control valve of FIGS. 3 and 4.
Figure 6:
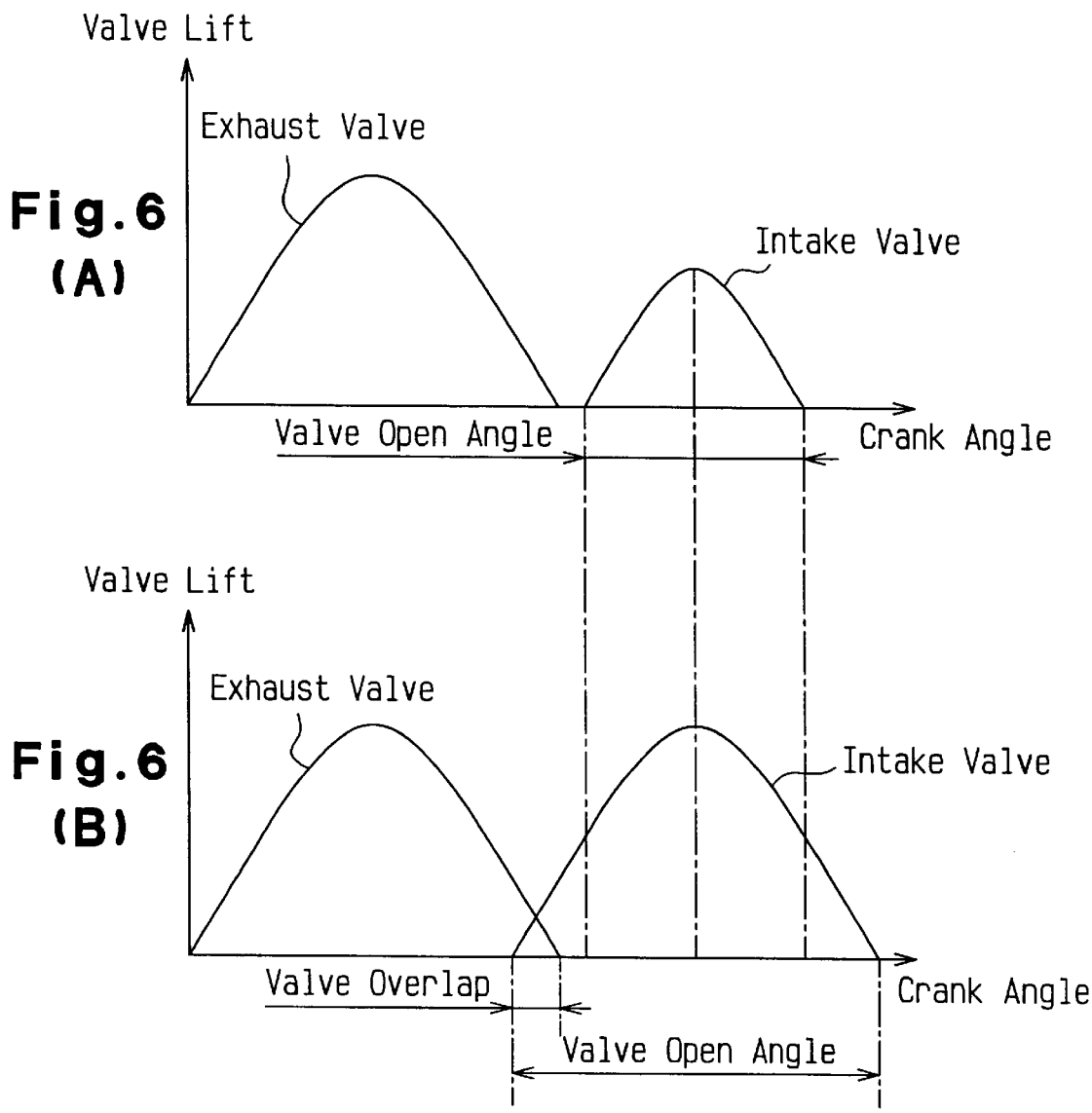
FIGS. 6(A) and 6(B) are graphs showing a relationship between the crank angle and the valve lift for an intake valve and an exhaust valve of the valve train of FIG. 1.

As shown in FIG. 5, the spool 138 can be positioned midway between the leftmost position and the rightmost position in the casing 116 by controlling current to the solenoid 136. In this state, the first and second ports 118, 120 are closed and oil flow through the ports 118, 120 is stopped. Oil is therefore not supplied to or drained from the first and second pressure chambers 165, 166. Oil remaining in the chambers 165, 166 fixes the position of the ring gear 162, which fixes the axial position of each intake cam 28 relative to the associated cam follower 21a. In other words, the current valve lift and the valve open angle of the intake valves 21 are maintained.

Referring back to FIG. 1, the vehicle includes an electronic control unit (ECU) 180 to control the valve lift of the intake valves 21. Specifically, the ECU 180 controls the electricity supplied to the OCV 170. The ECU 180 is a microcomputer, which includes a CPU 182, a ROM 183, a RAM 184 and external input and output circuits 187, 188.

The ROM 183 stores various control programs and data such as maps and tables used in the programs. The CPU 182 executes various computations in accordance with the programs stored in the ROM 183. The RAM 184 temporarily stores the results of the computations by the CPU 182 and data from various sensors. The backup RAM 185 is a non-volatile storage that stores necessary data when the engine 11 is stopped. The CPU 182, ROM 183, the RAM 184, the backup RAM 185 and the external input and output circuits 187, 188 are connected to one another by a bus 186.

An electromagnetic pickup 190 for the crankshaft 15 and a shaft position sensor 194 for the intake camshaft 23 are connected to the external input circuit 187. Further, various sensors for detecting the state of the engine 11 such as an intake pressure sensor and a throttle sensor (neither is shown) are connected to the external input circuit 187. The pickup 190 detects the rotational phase or the rotation speed of the crankshaft 15. The shaft position sensor 194 detects the axial position of the intake camshaft 23. The external output circuit 188 is connected to the OCV 170.

An ECU 201 for controlling a throttle valve 202 is connected to the external input and output circuits 187, 188. The ECUs 180 and 201 exchange data necessary for controlling the engine 11. The ECU 201 computes a required torque based on detection values of a gas pedal sensor and other sensors for detecting the condition of the engine 11. The ECU 201 adjusts the opening of the throttle valve 202 to an required opening amount. The ECU 201 also judges whether the opening of the throttle valve 202 is changing in accordance with commands from the ECU 201 based on detection signals from a throttle sensor located in the vicinity of at the throttle valve 202. If the ECU 201 judges that the throttle valve 202 is not responding to the commands, the ECU 201 sends a throttle abnormality signal, or signal indicating an abnormality of the throttle valve 202, to the ECU 180.

The ECU 180 controls the performance of the intake valves 21. The ECU 180 optimizes the running state of the engine 11. Specifically, the ECU 180 controls the OCV 170 for adjusting the valve lift and the valve open angle of the intake valves 21 based on detection signals from the sensors that detect the state of the engine 11. For example, the ECU 180 receives the engine speed detected by the pickup 190 and the engine load detected by the intake pressure sensor. Then, the ECU 180 uses the engine speed and the engine load as parameters and computes a target axial position of the intake camshaft 23, which corresponds to a target valve lift. The target valve lift is related to the parameters according to function data. The ECU 180 controls the actuator 25 to move the intake camshaft 23 to the target axial position.

When controlling the OCV 170, the ECU 180 receives signals from the shaft position sensor 194 and computes the axial position of the intake camshaft 23 based on the received signals. The ECU 180 uses the OCV 170 to feedback control the actuator 25 such that the intake camshaft 23 is moved to an axial position at which the valve lift and the open angle match target values.

Figure 7:
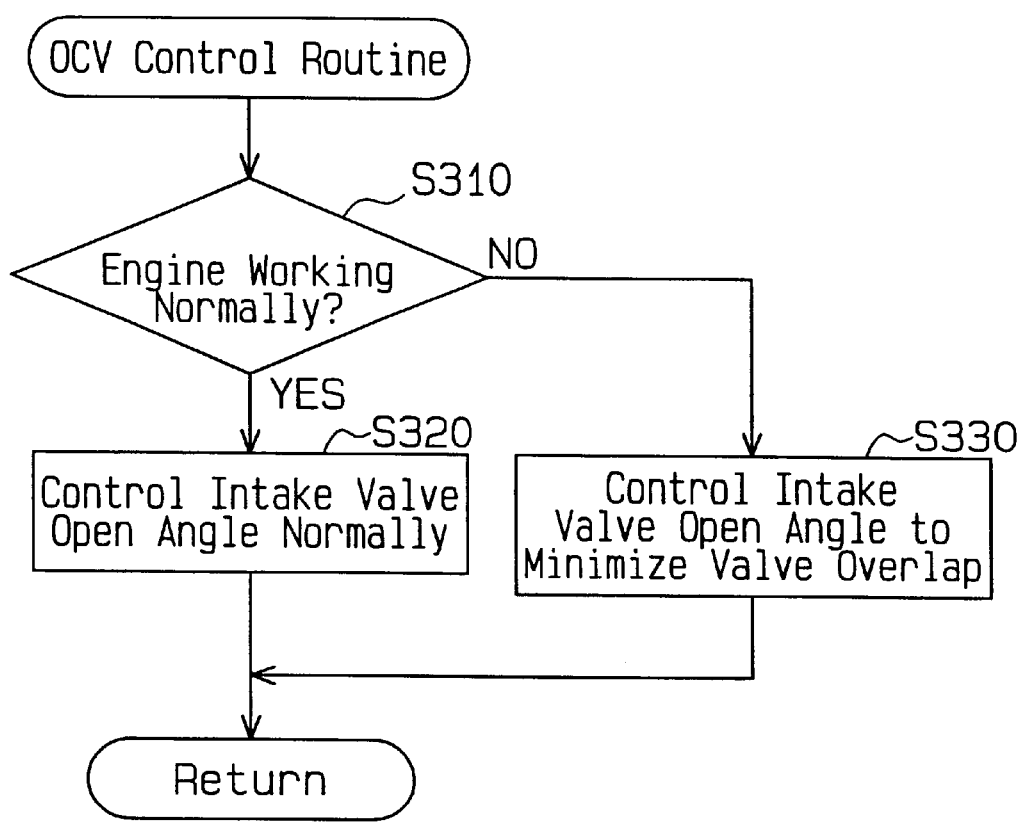
FIG. 7 is a flowchart showing a routine executed by an ECU for controlling the oil control valve of the valve train of FIG. 1.

The ECU 180 executes the routine of FIG. 7 at predetermined intervals or at predetermined crank angles to control the OCV 170.

When entering the routine, the ECU 180 judges whether the engine 11 is running normally (S310). If a throttle abnormality signal is not sent from the ECU 201, the ECU 180 judges that the engine 11 is running normally. If a throttle abnormality signal is sent from the ECU 201, the ECU 180 judges that there is malfunction in the engine 11.

If the engine 11 is running normally, the ECU 180 controls the valve open angle of the intake valves 21 by a normal procedure (S320). Specifically, the ECU 180 uses the engine speed, which is detected by the pickup 190, and the engine load, which is computed based on signals from the intake pressure sensor, as parameters. The ECU 180 computes a target axial position of the intake camshaft 23, which corresponds to a target valve open angle, based on the parameters according to function data. The ECU 180 controls the actuator 25 such that the intake camshaft 23 is moved to the target shaft position.

The ECU 180 receives detection signals from the shaft position sensor 194 and computes the axial position of the intake camshaft 23 based on the signals from the sensor 194. The ECU 180 feedback controls the actuator 25 by means of the OCV 170 such that the intake camshaft 23 is moved to the target shaft position.

If there is a malfunction in the engine 11, the ECU 180 controls the valve open angle of the intake valves 21 at step S330 according to a fail-safe procedure. Specifically, the ECU 180 moves the intake camshaft 23 to minimize or decrease the valve overlap. In other words, the ECU 180 sets the closing timing of the intake valves 21 to the most advanced position. At this time, the intake camshaft 23 is located at the leftmost position as shown in FIG. 3.

In this manner, when there is a malfunction in the engine 11, the valve overlap is set to zero, which stabilizes the engine speed. Also, since the closing timing of the intake valves 21 is advanced, starting of the engine 11 is facilitated. Thus, after being stopped, the engine 11 can be quickly restarted, which makes it easier for the driver to take steps to correct the malfunction.

A second embodiment will now be described. The second embodiment is the same as the first embodiment except that the outer teeth 163 of the ring gear 162 and the inner teeth 157 of the cover 154 are replaced with left-handed helical gears (not shown), and except that the control routine differs from the routine of FIG. 7.

Figure 8:
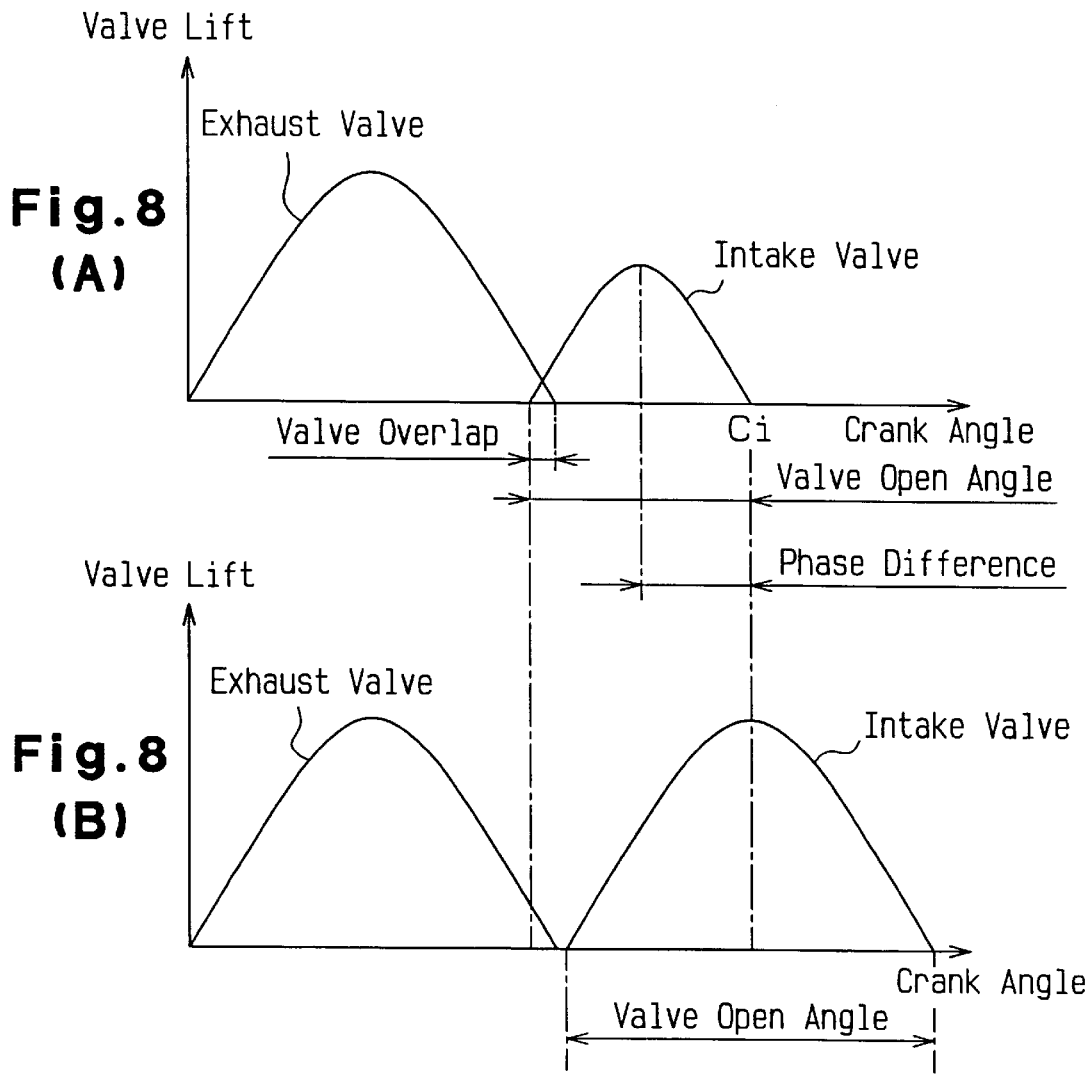
FIGS. 8(A) and 8(B) are graphs showing a relationship between the crank angle and the valve lift for an intake valve and an exhaust valve in a valve train according to a second embodiment of the present invention.

In FIG. 3, if left-handed helical teeth were used on the ring gear 162 and the cover 154 instead of spur teeth, or splines, according to the second embodiment, the phase of the intake camshaft 23 would be advanced relative to the cover 154. As shown in FIG. 8(A), under these circumstances, the valve open angle is advanced, and the closing timing Ci of the intake valves 21 is more advanced than the closing timing corresponding to the state of FIG. 3 in the first embodiment, which is shown in FIG. 6(A).

In the second embodiment when the intake camshaft 23 is moved to the rightmost position like in FIG. 4, the phase of the intake camshaft 23 is retarded relative to the cover 154 due to the helical gear teeth (not shown). Accordingly, the valve open angle is retarded as shown in FIG. 8(B).

Figure 9:
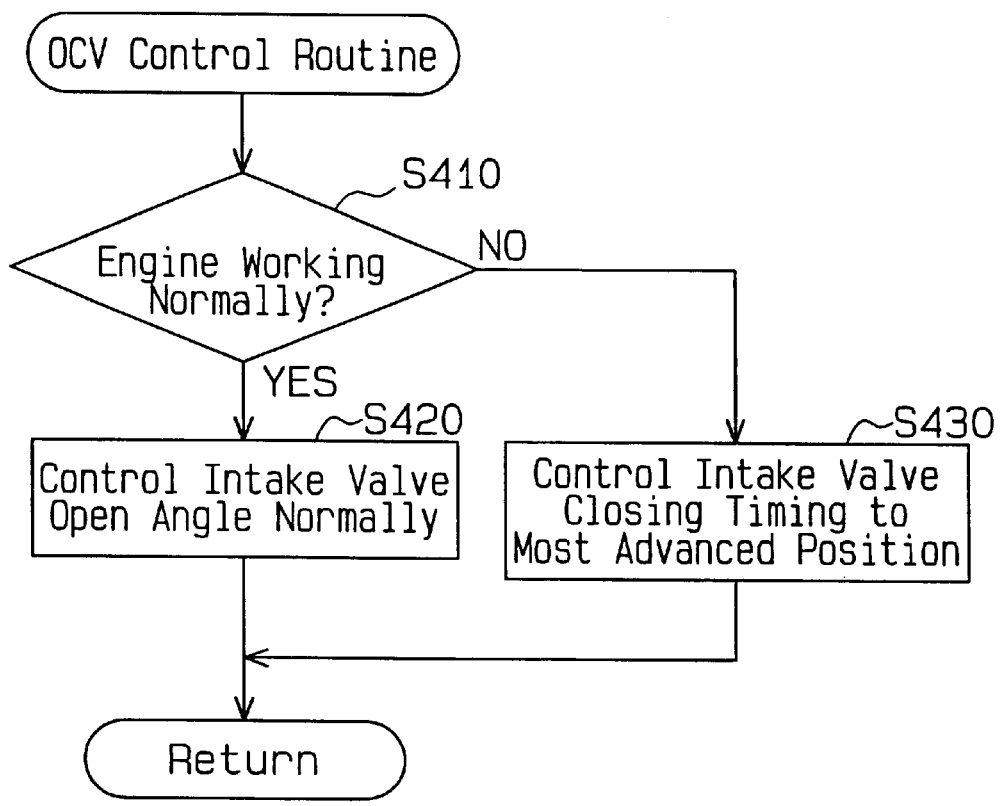
FIG. 9 is a flowchart showing a routine executed by an ECU for controlling an oil control valve of the valve train of the second embodiment.

In the second embodiment, the ECU 180 executes the routine of FIG. 9 at predetermined intervals or at a predetermined crank angles. Steps S410, S420 are the same as steps S310, S320 of the flowchart of FIG. 7.

If there is a malfunction in the engine 11, the ECU 180 moves the intake camshaft 23 such that the closing timing of the intake valves 21 is most advanced, which is a fail-safe procedure to facilitate starting of the engine 11. When the intake camshaft 23 is at the leftmost position as shown in FIG. 3, the closing timing of the intake valves 21 is most advanced as shown in FIG. 8(A). In this state, the valve open angle of the intake valves 21 is the smallest. Since the closing timing of the intake valves 21 is most advanced, the starting of the engine 11 is facilitated.

A third embodiment will now be described. The third embodiment is the same as the second embodiment except that the routine of FIG. 9 is replaced by the routine of FIG. 7. That is, when there is a malfunction in the engine 11, the intake camshaft 23 is moved to a position at which the valve overlap is minimum.

The intake camshaft 23 is moved to the rightmost position like in FIG. 4 so that the valve overlap is minimized, or zero, as illustrated in FIG. 8(B). At this time, the valve open angle of the intake valves 21 is the widest and the phase of the intake camshaft 23 is most retarded. Decreasing the valve overlap stabilizes the engine speed.

Figure 10:
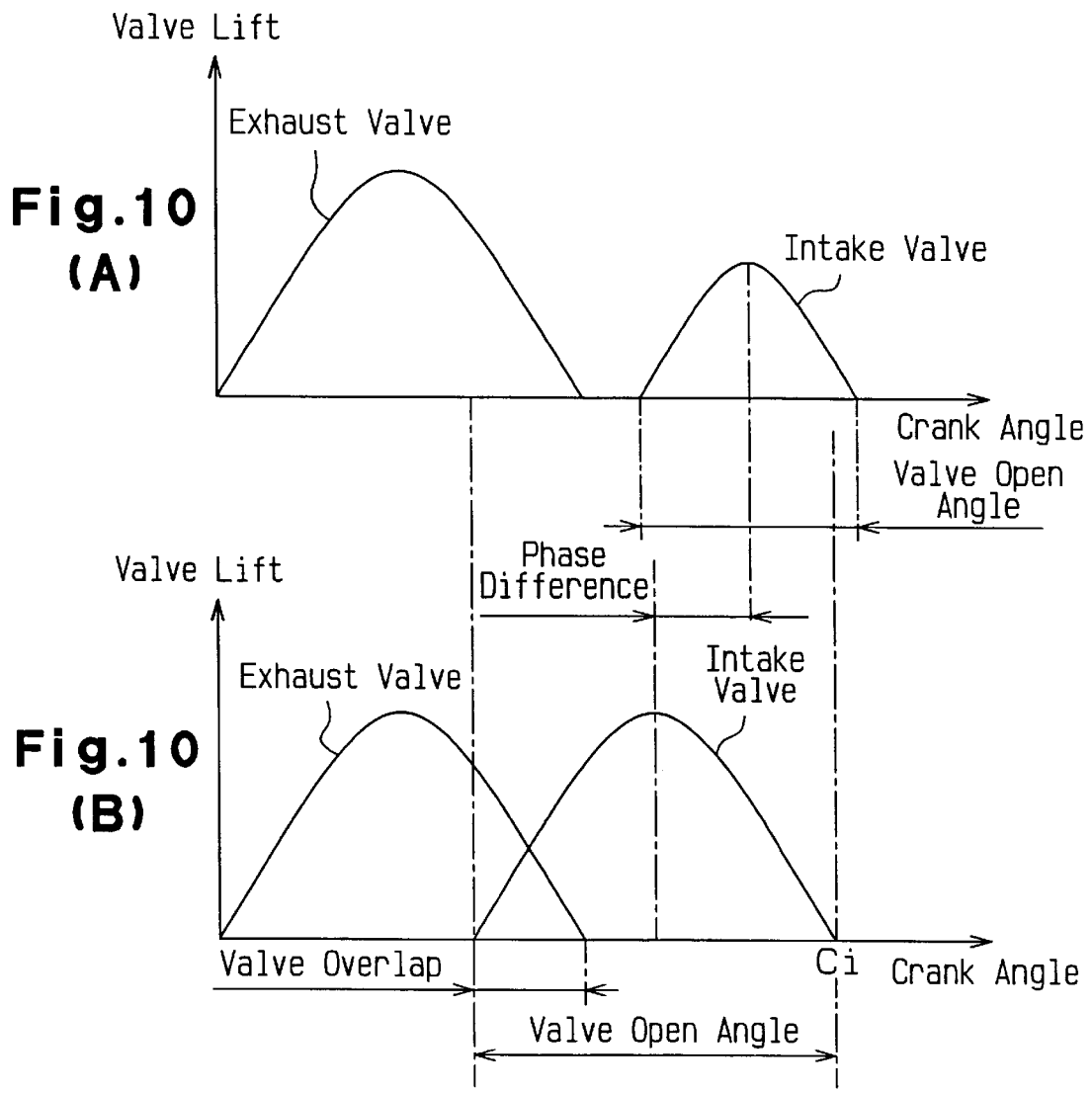
FIGS. 10(A) and 10(B) are graphs showing a relationship between the crank angle and the valve lift for an intake valve and an exhaust valve in a variable performance valve train according to a fourth embodiment of the present invention.

A fourth embodiment will now be described. The mechanism of the fourth embodiment is the same as the mechanism of the second embodiment except that the left-handed helical teeth are replaced with right-handed helical teeth. The routine of FIG. 7 is used to control the actuator 25. The performance of the intake valves 21 according to the fourth embodiment is shown in FIGS. 10(A) and 10(B).

If there is a malfunction in the engine 11, the ECU 180 moves the intake camshaft 23 to the leftmost position like in FIG. 3 to minimize the valve overlap (step S330). Thus, the valve open angle of the intake valves 21 is the smallest and its phase is most retarded. Therefore, the fourth embodiment has the same advantages as the first embodiment.

A fifth embodiment will now be described. The fifth embodiment is the same as the fourth embodiment except that the routine of FIG. 7 is replaced by the routine of FIG. 9.

If there is a malfunction in the engine 11, the ECU 180 shifts the closing timing of the intake valves 21 to the most advanced timing (step S430) by moving the intake camshaft 23. At this time, the valve open angle of the intake valves 21 is the largest and its phase is most advanced. Therefore, the fifth embodiment has the same advantages as the second embodiment.

A sixth embodiment will now be described with reference to FIG. 11. The sixth embodiment is different from the first embodiment in that the actuator 25 is attached to the exhaust camshaft 22 and in that the exhaust cams 27 are three-dimensional. The intake camshaft 23 does not move axially.

Figure 11:
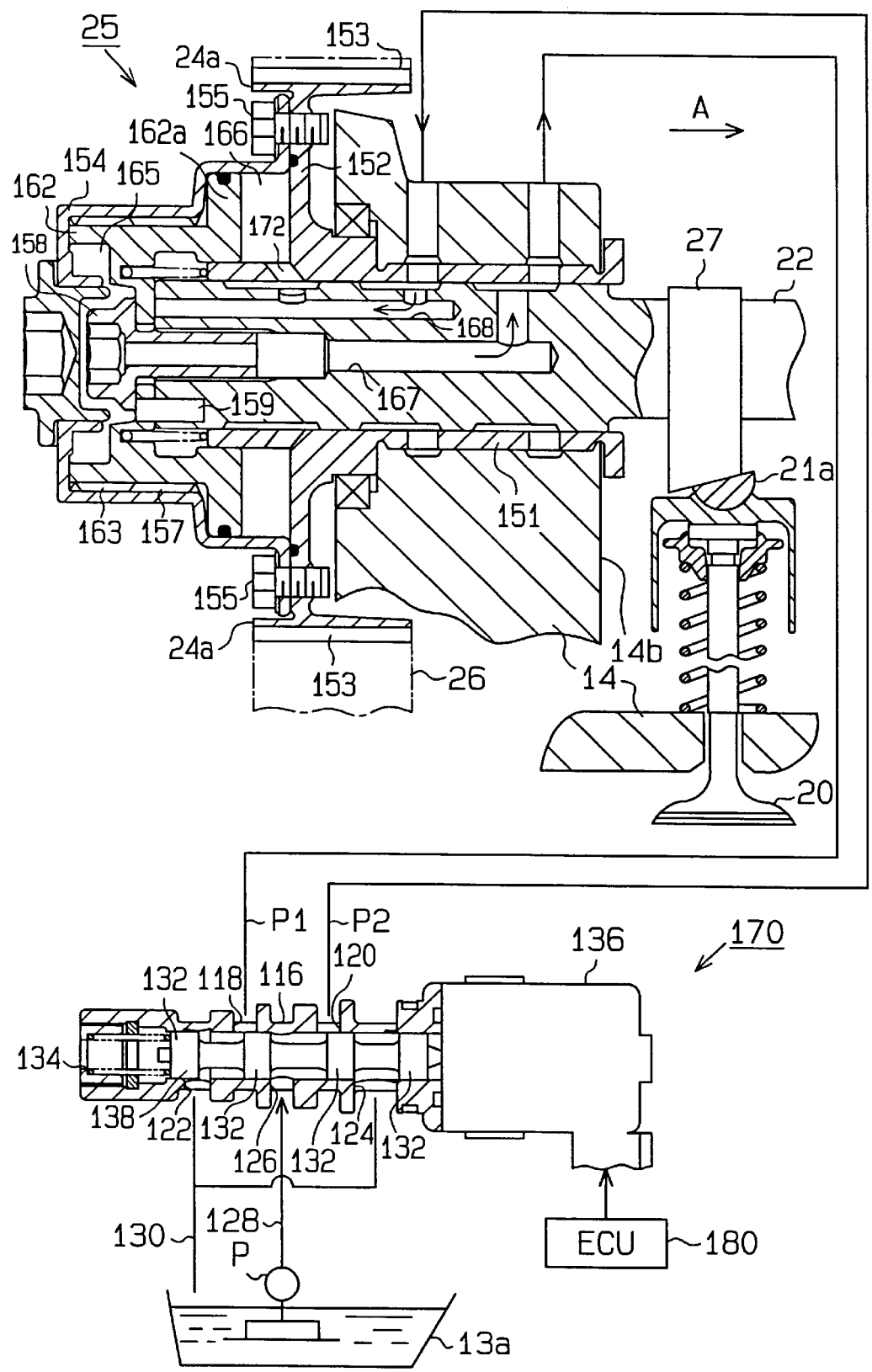
FIG. 11 is a diagrammatic cross-sectional view illustrating a variable valve lift actuator and an oil control valve in a variable performance valve train according to a sixth embodiment of the present invention.
Figure 13:
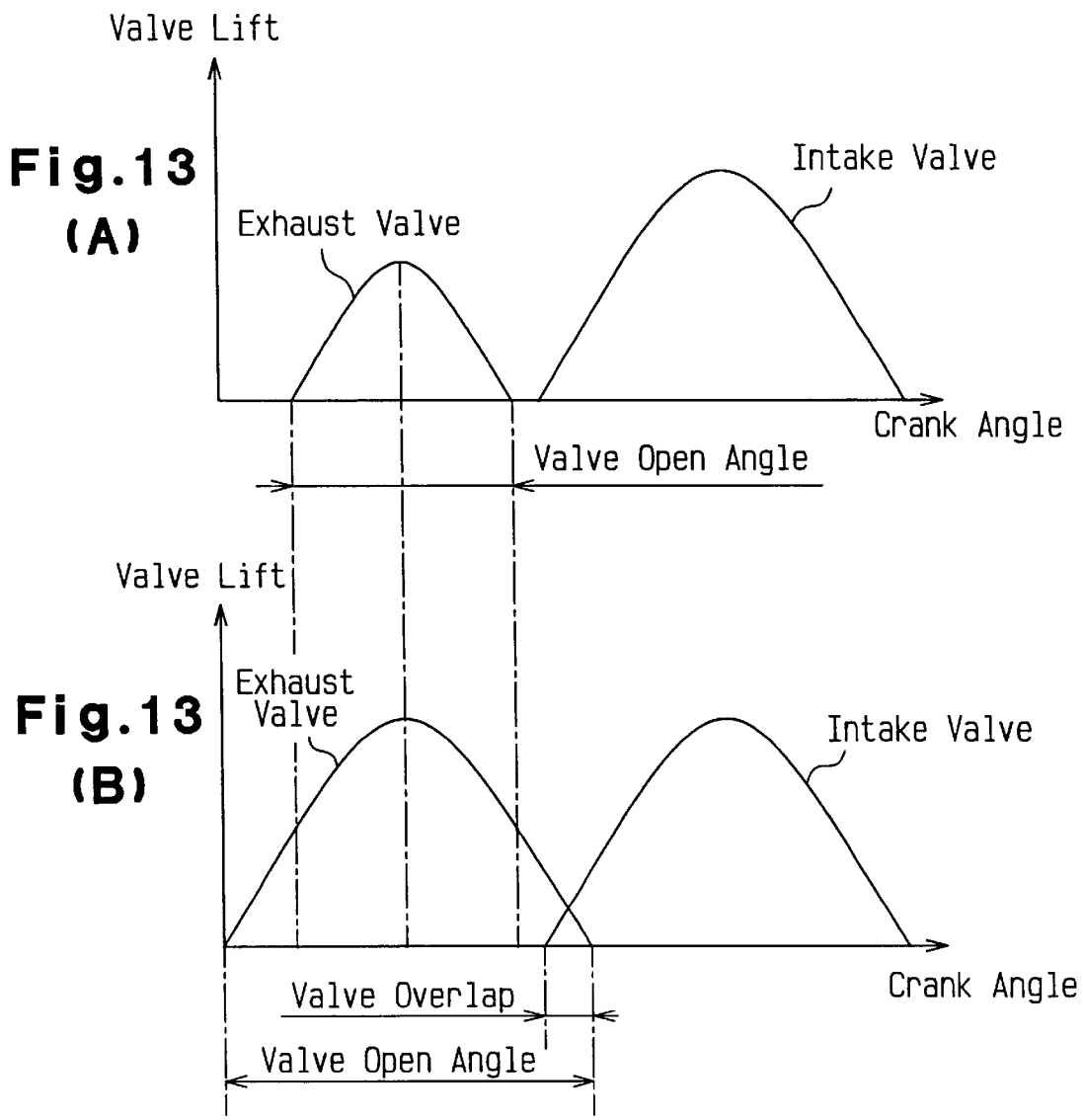
FIGS. 13(A) and 13(B) are graphs showing a relationship between the crank angle and the valve lift for an intake valve and an exhaust valve of the sixth embodiment.

When the exhaust camshaft 22 is at the leftmost position as illustrated in FIG. 11, the valve open angle of the exhaust valves 20 is the smallest as shown in FIG. 13(A).

Figure 12:
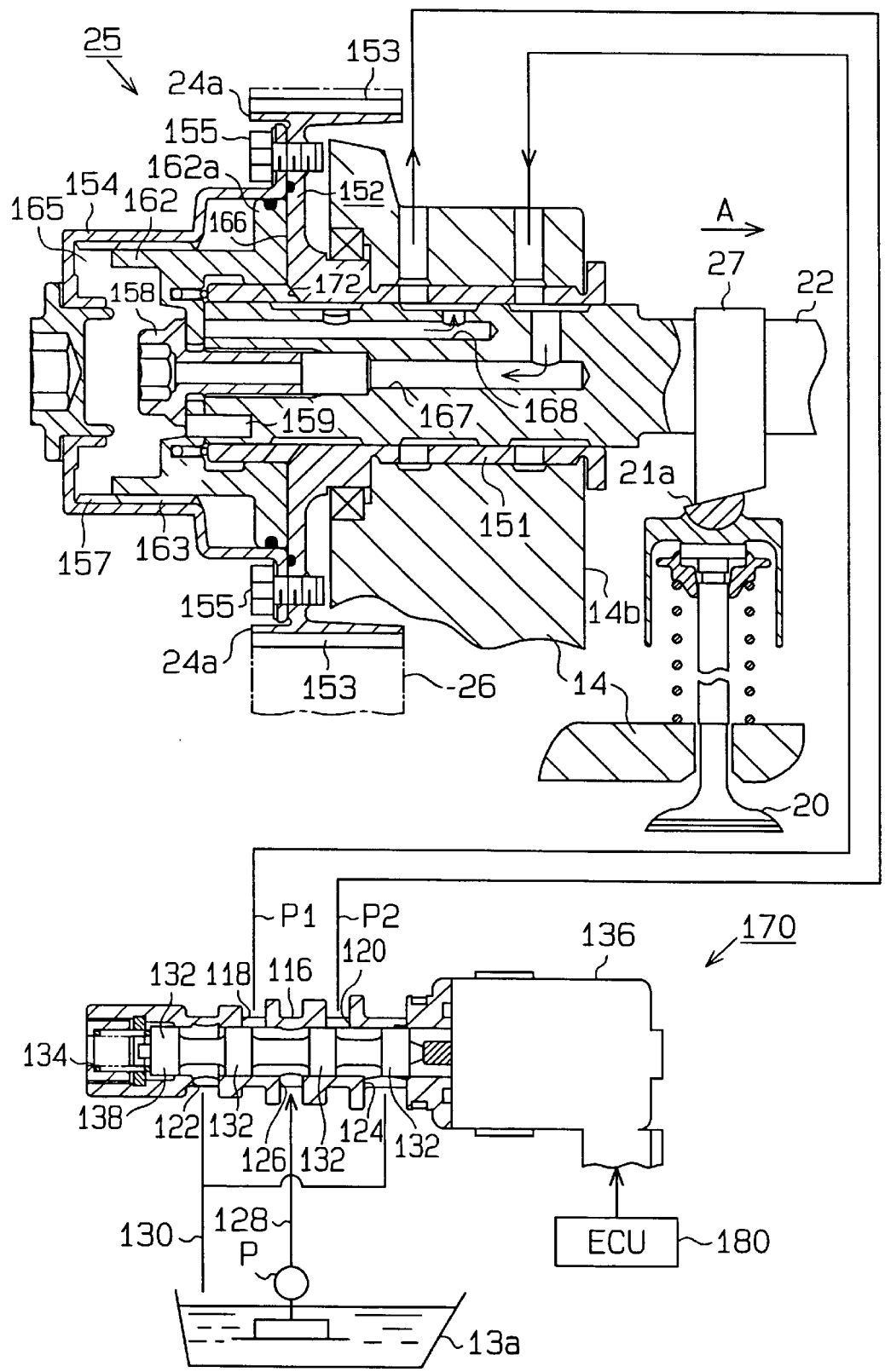
FIG. 12 is a diagrammatic cross-sectional view illustrating an operational state of the actuator and the control valve of FIG. 11.

When the exhaust camshaft 22 is at the rightmost position as illustrated in FIG. 12, the valve open angle of the exhaust valves 20 is the largest as shown in FIG. 13(B).

Figure 14:
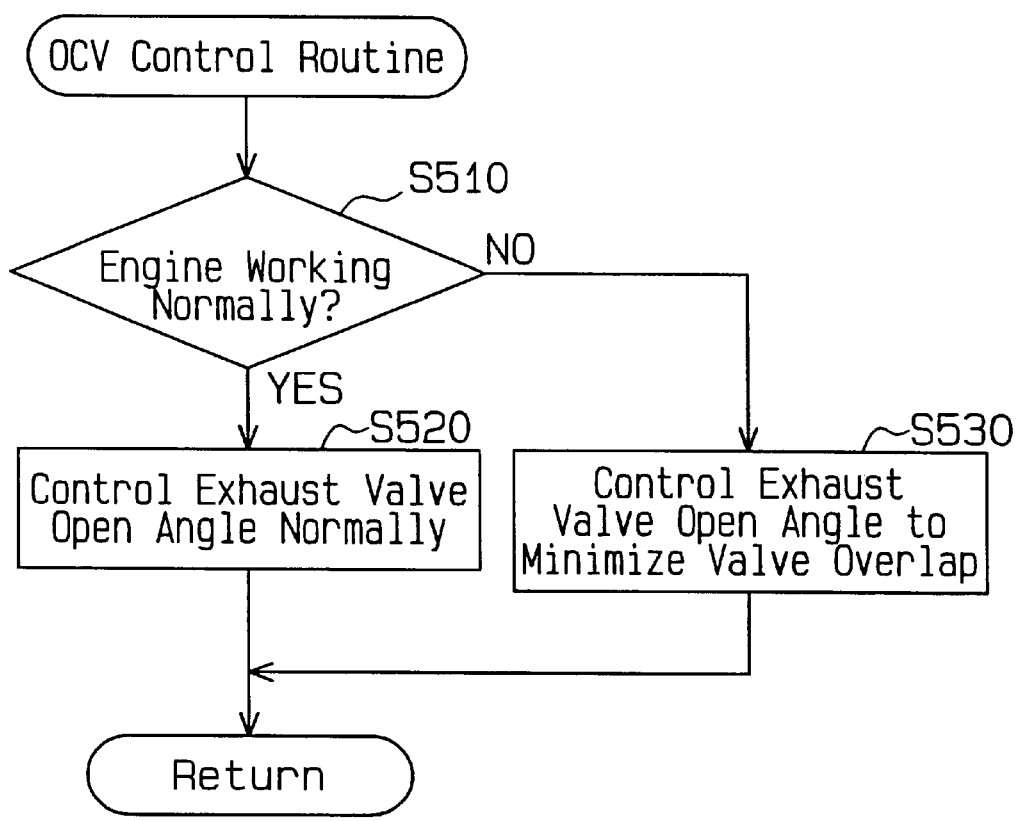
FIG. 14 is a flowchart showing a routine executed by an ECU for controlling the oil control valve of the valve train according to the sixth embodiment.

In the sixth embodiment, the ECU 180 executes the routine of FIG. 14 at predetermined intervals or at predetermined crank angles.

First, the ECU 180 judges whether the engine 11 is running normally (step S510).

If there is no malfunction in the engine 11, the ECU 180 feedback controls the valve open angle of the exhaust valves 20 by the normal procedure (step S520).

If there is a malfunction in the engine 11, the ECU 180 moves the exhaust camshaft 22 axially to minimize the valve overlap (step S530). At this time, as shown in FIG. 13(A), the opening timing of the exhaust valve 20 is retarded so that there is no valve overlap. This stabilizes the engine speed. The retarded opening timing of the exhaust valves 20 further stabilizes the engine speed.

A seventh embodiment will now be described. The seventh embodiment is different from the sixth embodiment in that the outer spur teeth 163, or splines, of the ring gear 162 and the inner spur teeth 157, or splines, of the cover 154 are replaced by left-handed helical teeth (not shown).

Figure 15:
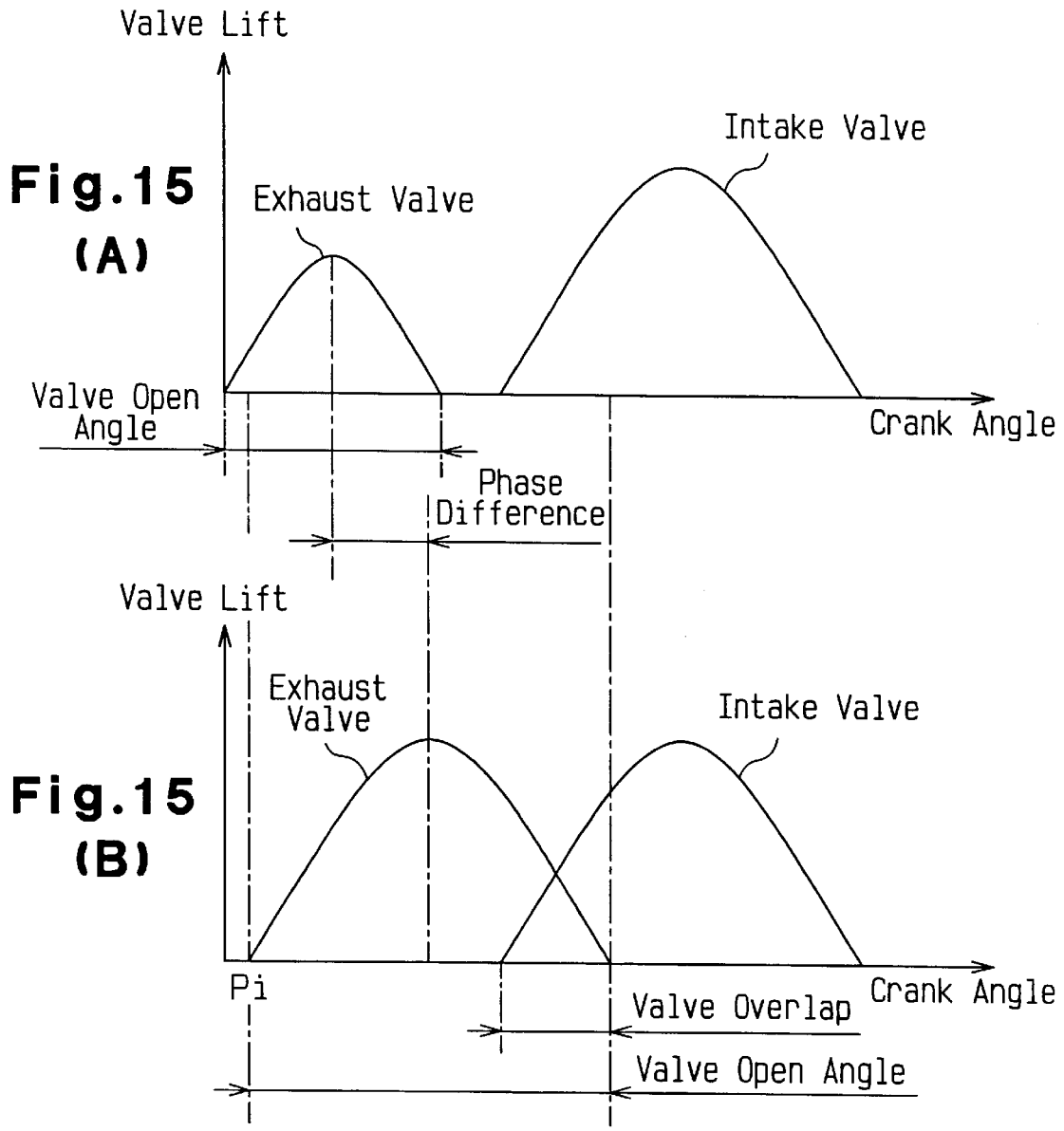
FIGS. 15(A) and 15(B) are graphs showing a relationship between the crank angle and the valve lift for an intake valve and an exhaust valve according to a seventh embodiment of the present invention.

When the exhaust camshaft 22 is at the leftmost position like in FIG. 11, the valve lift and the valve open angle of the exhaust valve 20 are smallest as illustrated in FIG. 15(A).

If the exhaust camshaft 22 is at the rightmost position like in FIG. 12, the valve lift of the exhaust valve 20 is maximum and the valve open angle is largest as shown in FIG. 15(B). At this time, the valve open angle of the exhaust valve 20 is most retarded.

Figure 16:
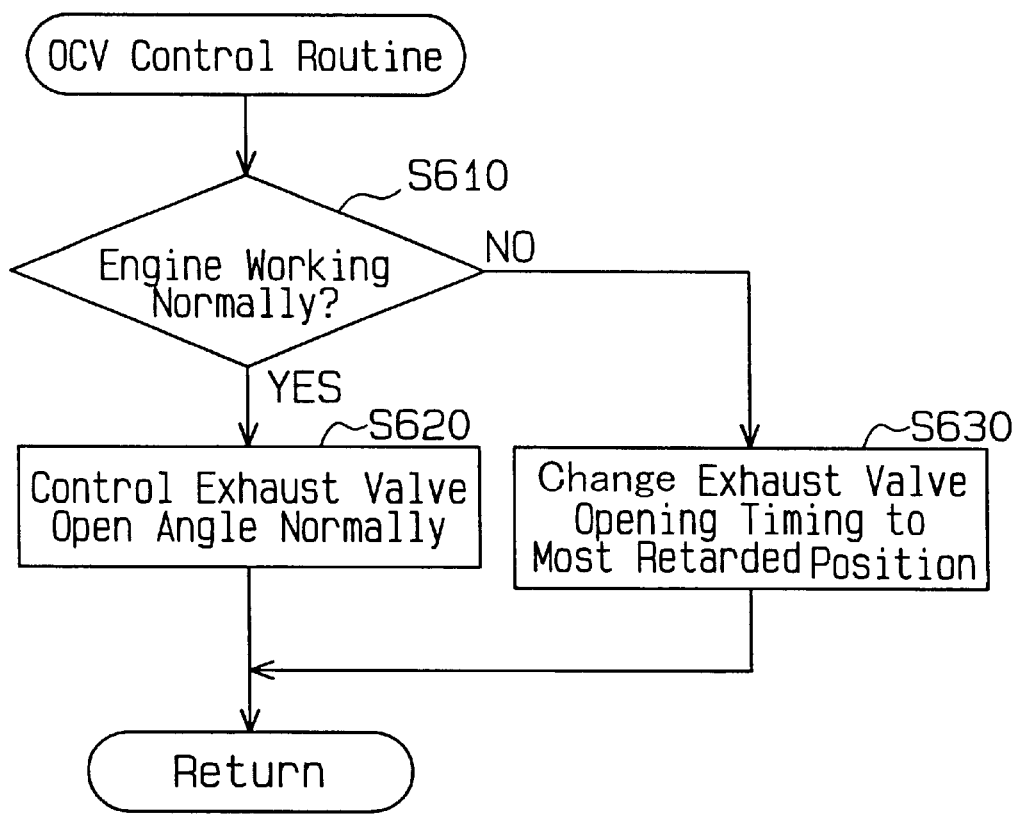
FIG. 16 is a flowchart showing a routine executed by an ECU for controlling an oil control valve of a variable performance valve train according to the seventh embodiment.

In the seventh embodiment, the ECU 180 executes the routine of FIG. 16 to control the actuator 25. Steps S610, S620 are the same as steps S510, S520 of the sixth embodiment.

If there is a malfunction in the engine 11, the ECU 180 axially shifts the exhaust camshaft 22, which changes the opening timing of the exhaust valve 20 to the most retarded timing in a fail-safe procedure (step S630), which stabilizes the engine speed.

An eighth embodiment of the present invention will now be described. The eighth embodiment is the same as the seventh embodiment except that the routine of FIG. 16 is replaced with a routine of FIG. 14.

When there is a malfunction in the engine 11, the ECU 180 moves the exhaust camshaft 22 to minimize the valve overlap (step S530), which stabilizes the engine speed.

A ninth embodiment will now be described. The ninth embodiment is different from the seventh embodiment in that the left-handed helical teeth are replaced with right-handed helical teeth (not shown).

Figure 17:
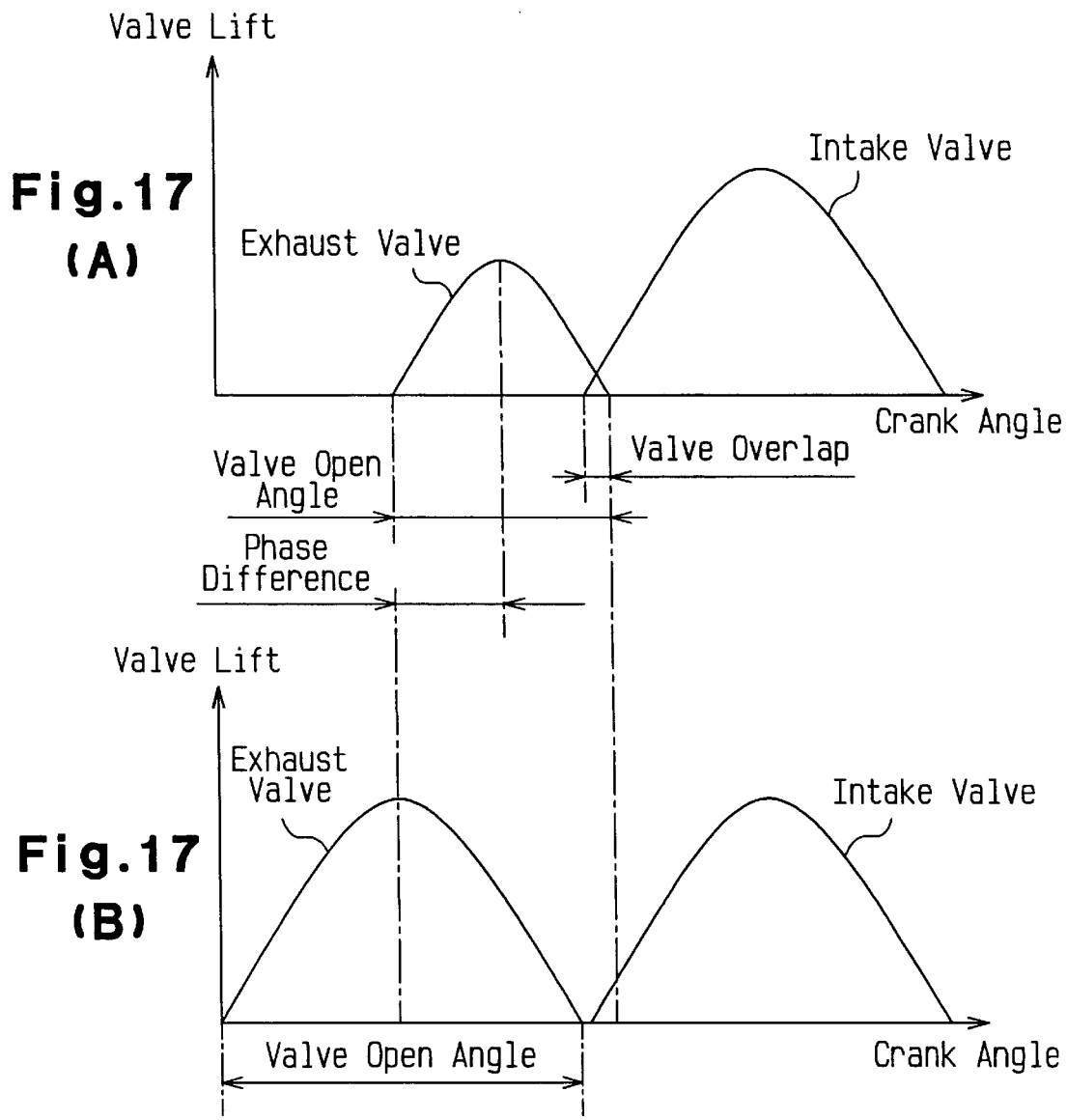
FIGS. 17(A) and 17(B) are graphs showing a relationship between the crank angle and the valve lift for an intake valve and an exhaust valve in a valve train according to a ninth embodiment of the present invention.

When there is a malfunction in the engine 11, the ECU 180 moves the exhaust camshaft 22 such that the opening timing of the exhaust valve 20 is most retarded as illustrated in FIG. 17(A)(step S630). The valve overlap is maximized accordingly, and the engine speed is stabilized.

A tenth embodiment will now be described. The tenth embodiment is different from the ninth embodiment in that the routine of FIG. 16 is replaced with the routine of FIG. 14.

When there is a malfunction in the engine 11, the ECU 180 minimizes the valve overlap as shown in FIG. 17(B) (step S530). Therefore, the tenth embodiment has the same advantages as those of the eighth embodiment.

An eleventh embodiment will now be described with reference to FIGS. 18 to 24.

Figure 18:
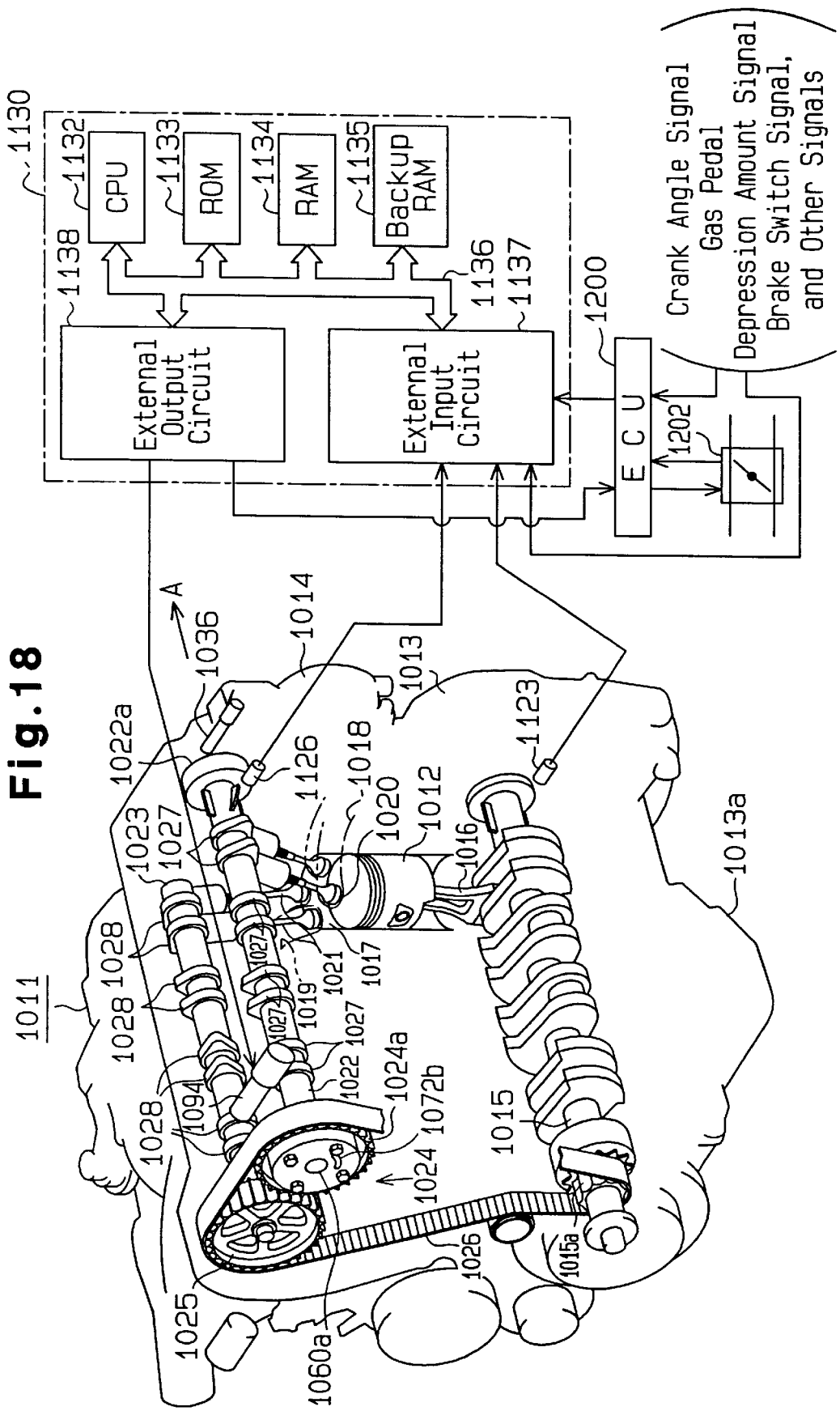
FIG. 18 is a partial perspective view illustrating a variable performance valve train according to an eleventh embodiment of the present invention.

As shown in FIG. 18, an engine 1011 basically has the same structure as the engine 11 shown in FIG. 1. The engine 1011 further has a first actuator 1022a for varying valve open angle and a second actuator for varying the valve timing. The second actuator 1024 and a timing pulley 1024a are provided at the left end of an intake camshaft 1022. The first actuator 1022a is provided at the right end of the intake camshaft 1022.

Figure 19:
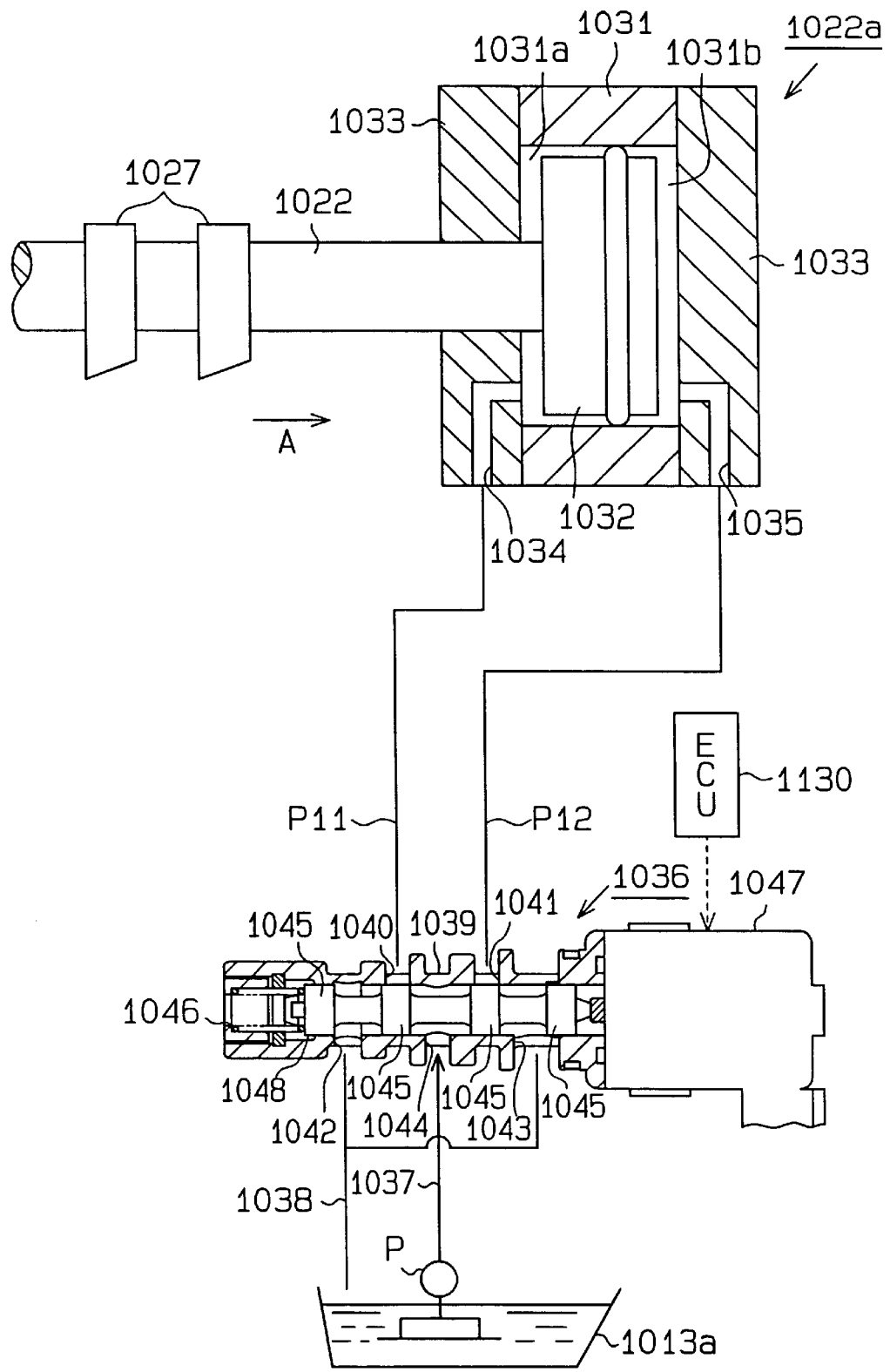
FIG. 19 is a diagrammatic cross-sectional view illustrating a valve actuator and a first oil control valve of the valve train of FIG. 18.

The first actuator 1022a and an oil supply system, which supplies hydraulic oil to the actuator 1022a, will now be described with reference to FIG. 19.

The actuator 1022a includes a cylinder tube 1031 and a piston 1032 accommodated in the cylinder tube 1031. A pair of end covers 1033 close the openings of the tube 1031. The cylinder tube 1031 is fixed to the cylinder head 1014.

The intake camshaft 1022 extends through one of the covers 1033 and is coupled to the piston 1032. The piston 1032 defines a first pressure chamber 1031a and a second pressure chamber 1031b in the tube 1031. A first passage 1034 and a second passage 1035 are formed in the covers 1033, respectively. The first passage 1034 communicates with the first pressure chamber 1031a and the second passage 1035 communicates with the second pressure chamber 1031b.

When oil is supplied to the first pressure chamber 1031a or the second pressure chamber 1031b via the first passage 1034 or the second passage 1035, respectively, the piston 1032 is moved axially. Accordingly, the intake camshaft 1022 is moved axially in a direction corresponding to the chamber 1031a, 1031b that is pressurized.

The first passage 1034 and the second passage 1035 are connected to a first oil control valve (OCV) 1036 by passages P11 and P12, respectively. The first OCV 1036 has the same structure as the OCV 170 of the first embodiment. That is, the first OCV 1036 is actuated by controlling the electric current fed to a solenoid. 1047.

The second actuator 1024 will now be described with reference to FIG. 20.

The second actuator 1024 includes the timing pulley 1024a. The timing pulley 1024a includes a cylindrical boss 1051 and a disk 1052 and outer teeth 1053. The boss 1051 slidably supports the intake camshaft 1022. The disk 1052 radially extends from the boss 1051. The teeth 1053 are formed on the circumferential surface of the disk 1052. The boss 1051 is rotatably supported by a support 1014a of the cylinder head 1014.

An inner gear 1054 is fixed to the distal end of the intake camshaft 1022 by a bolt 1055. The inner gear 1054 includes a large diameter portion 1054a and a small diameter portion 1054b. The small diameter portion 1054b has helical teeth, and the large diameter portion 1054a has straight spur teeth, or splines.

A ring-shaped sub-gear 1056 is fitted about the small diameter portion 1054b of the inner gear 1054. The sub gear 1056 includes outer teeth 1056a and inner teeth 1056b. The outer teeth 1056a are parallel to the axis of the camshaft 1022 and the inner teeth 1056b are helical. The outer diameter of the sub-gear 1054 is the same as that of the inner gear 1054. The inner teeth 1056b of the sub-gear 1056 mesh with the teeth of the small diameter portion 1054b. A spring washer 1057 is located between the inner gear 1054 and the sub-gear 1056. The spring washer 1057 urges the sub-gear 1056 away from the inner gear 1054.

A housing 1059 and a cover 1060 are coupled to the disk portion 1052 of the timing pulley 1024a by four bolts 1058. The cover 1060 seals first and second pressure chambers 1070, 1071, which will be described later. An opening 1060a is formed in the center of the cover 1060 to communicate a cylindrical hole 1061c, which will be described later, to the outside. The opening 1060a allows the intake camshaft 1022 to move easily in the axial direction.

Figure 20:
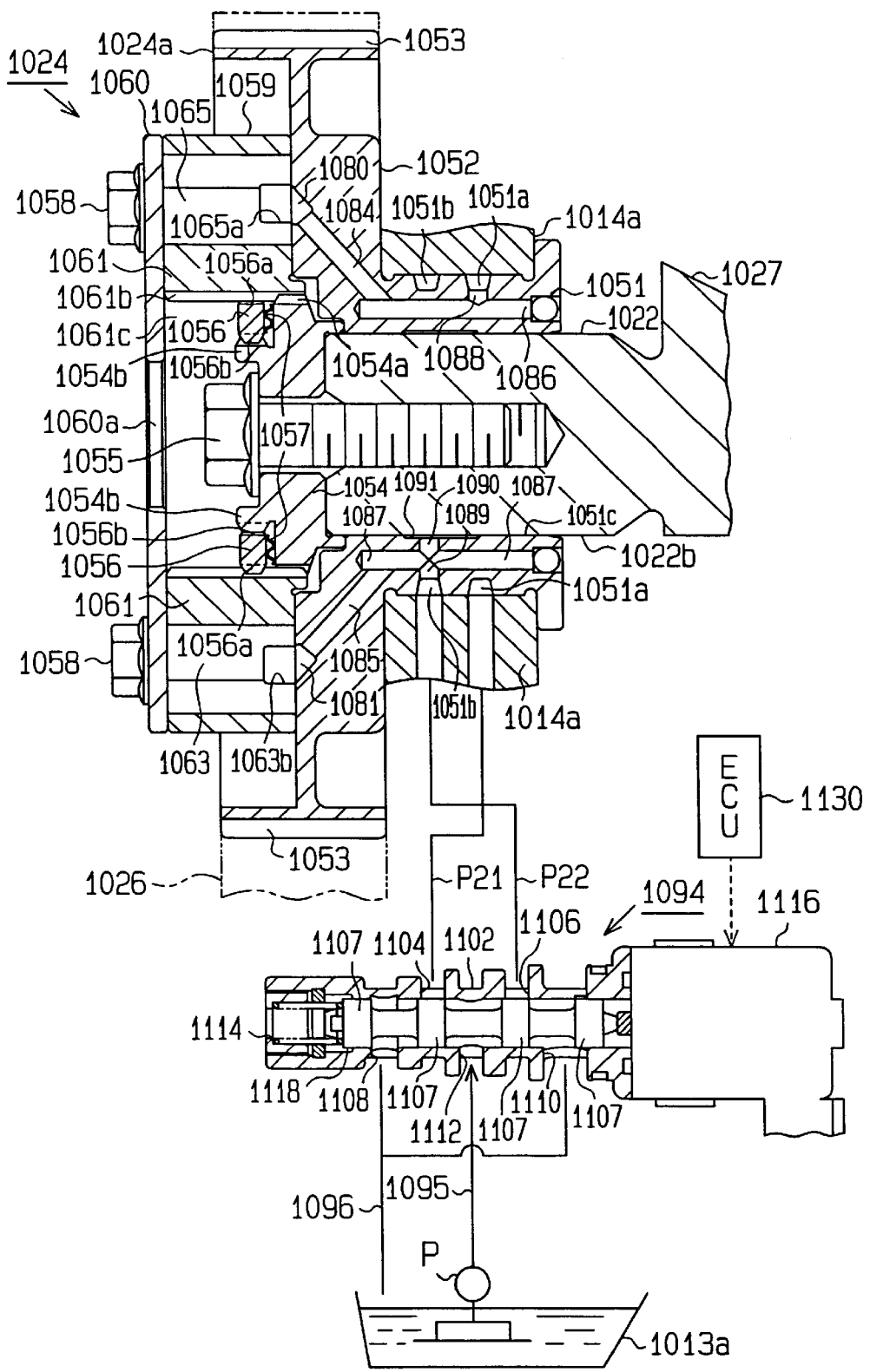
FIG. 20 is a diagrammatic cross-sectional view illustrating a variable valve timing mechanism and a second oil control valve of the valve train shown in FIG. 18.
Figure 21:
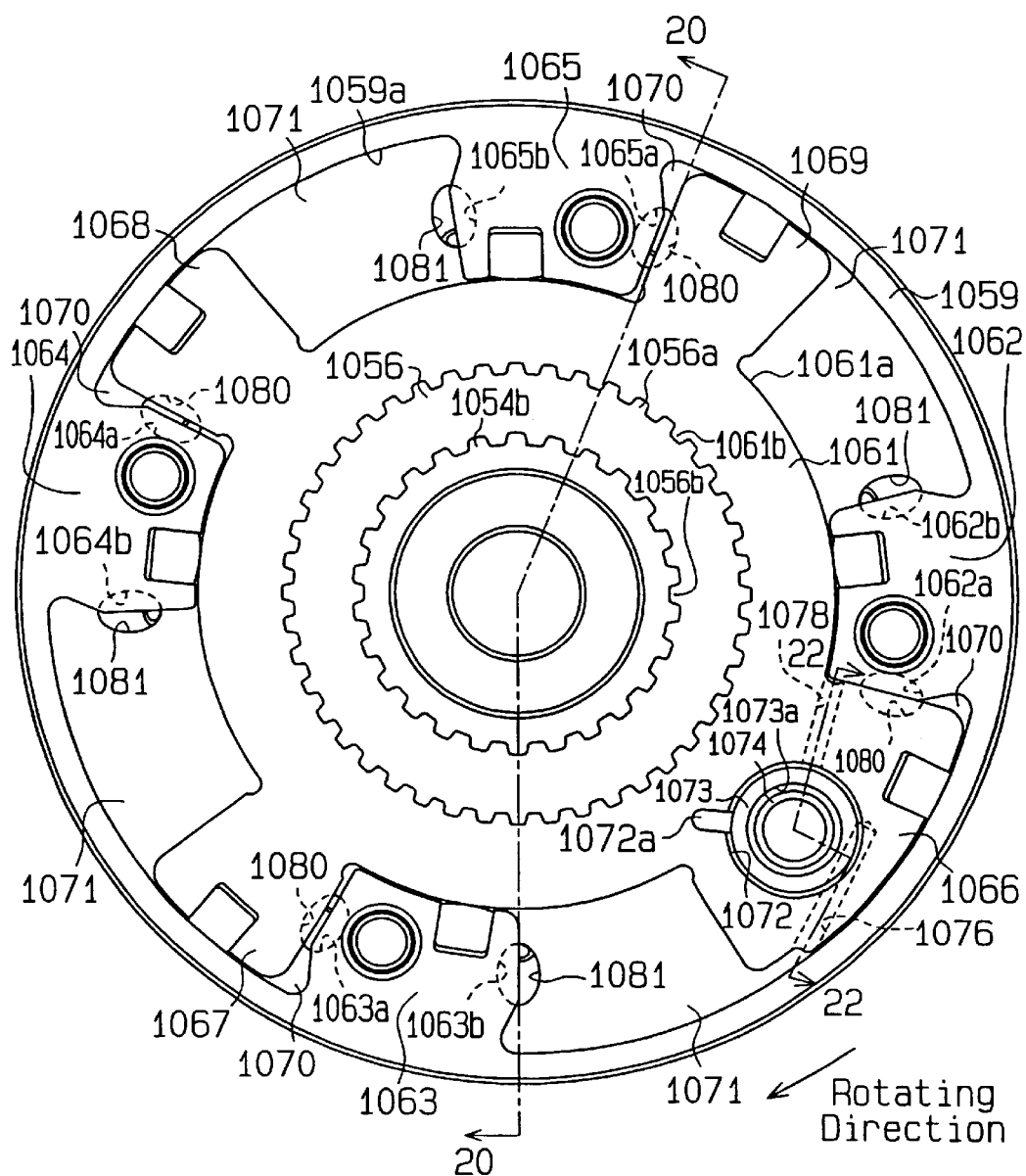
FIG. 21 is a front view illustrating the variable valve timing mechanism of FIG. 20 with the cover removed.

FIG. 21 shows the mechanism of FIG. 20 viewed from the left. In FIG. 21, the bolts 1058, the cover 1060 and the bolt 1055 are not shown. FIG. 20 is a cross-sectional view taken along line 21—21 of FIG. 21.

The housing 1059 has four projections 1062, 1063, 1064, 1065, which protrude from the inner surface 1059a. A vane rotor 1061 is rotatably fitted in the housing 1059. The vane rotor 1061 has outer walls 1061a, which contact the projections 1062, 1063, 1064, 1065.

The cylindrical hole 1061c is defined in the center of the vane rotor 1061 (see FIG. 20). Splines 1061b are formed on the inner wall of the hole 1061c. The splines 1061b extend along the axis of the intake camshaft 1022. The large diameter portion 1054a of the inner gear 1054 and the outer teeth 1056a of the sub-gear 1056 mesh with the splines 1061b.

Engagement of the inner teeth 1056b and the small diameter portion 1054b and the force of the spring washer 1057 urge the large diameter portion 1054a and the outer teeth 1056a in opposite rotational directions. Therefore, errors due to backlash between the splines 1061b and the gears 1054, 1056 are eliminated, which allows the inner gear 1054 to be accurately located at a predetermined rotational phase position relative to the vane rotor 1061. In other words, the vane rotor 1061 and the intake camshaft 1022 are accurately positioned relative to each other. In FIG. 20, only two of the splines 1061b are shown. However, the splines 1061b are formed along the entire wall of the hole 1061c as shown in FIG. 21.

Vanes 1066, 1067, 1068, 1069 protrude from the outer walls 1061a of the vane rotor 1061. The vanes 1066, 1067, 1068, 1069 are located in the spaces defined by the projections 1062, 1063, 1064, 1065. The distal ends of the vanes 1066, 1067, 1068, 1069 contact the inner surface 1059a of the housing 1059. Each of the vanes 1066, 1067, 1068, 1069 and the corresponding pairs of the projections 1062, 1063, 1064, 1065 define first and second pressure chambers 1070, 1071.

The vane 1066 has a through hole 1072 extending along the axis of the intake camshaft 1022. A lock pin 1073 is fitted in the through hole 1072 to move axially. A spring hole 1073a is formed in the lock pin 1073. A spring 1074 is accommodated in the spring hole 1073a to urge the lock pin 1073 toward the disk 1052.

An oil groove 1072a is formed in the front face of the vane rotor 1061. The oil groove 1072a connects an arcuate opening 1072b formed in the cover 1060 (see FIG. 18) to the through hole 1072. The opening 1072b and the oil groove 1072a drain air and oil located in a space that is axially front of the lock pin 1073 in the through hole 1072.

Operation of the lock pin 1073 will now be described with reference to FIGS. 22 and 23.

Figure 23:
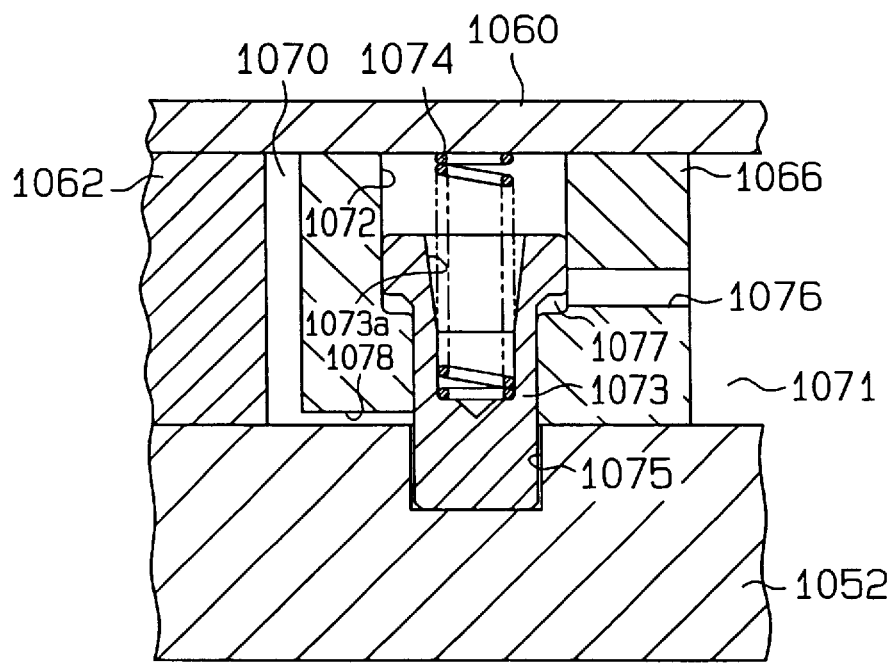
FIG. 23 is also an enlarged cross-sectional view illustrating a lock pin FIG. 22 when the pin is engaged with a recess.

When the lock pin 1073 faces a lock recess 1075 formed on the disk 1052 as illustrated in FIG. 23, the spring 1074 causes the lock pin 1073 to engage, or enter, the recess 1075. Accordingly, the rotational position of the vane rotor 1061 relative to the disk 1052 is fixed.

Figure 22:
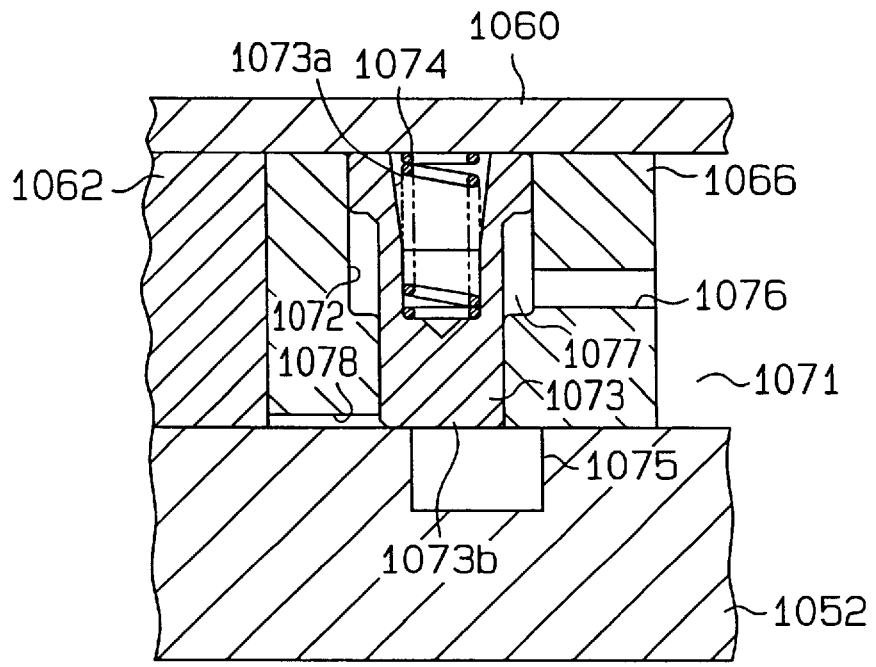
FIG. 22 is an enlarged cross-sectional view illustrating a lock pin of the mechanism of FIG. 20.

When the vane rotor 1061 is at the most retarded position, the lock pin 1073 does not face the recess 1075 and the distal end of the lock pin 1073 is not engaged with the recess 1075 as illustrated in FIG. 22. FIG. 21 also illustrates the vane rotor 1061 when the distal end of the lock pin 1073 is not engaged with the recess 1075.

For example, when the engine 1011 is being cranked or before the ECU 1130 starts activating the hydraulic system, the pressure of the first and second pressure chambers 1070, 1071 are zero or relatively low. At this time, the vane rotor 1061 is at the position of FIG. 21. In this case, cranking of the engine 1011 generates a reverse torque in the intake camshaft 1022, which advances the rotational phase of the vane rotor 1061 relative to the housing 1059. Accordingly, the lock pin 1073 is moved from the position of FIG. 22 to the position of FIG. 23 and enters the recess 1075. This prohibits further relative rotation between the vane rotor 1061 and the housing 1059 and causes the rotor 1061 to rotate integrally with the housing 1059.

Figure 24:
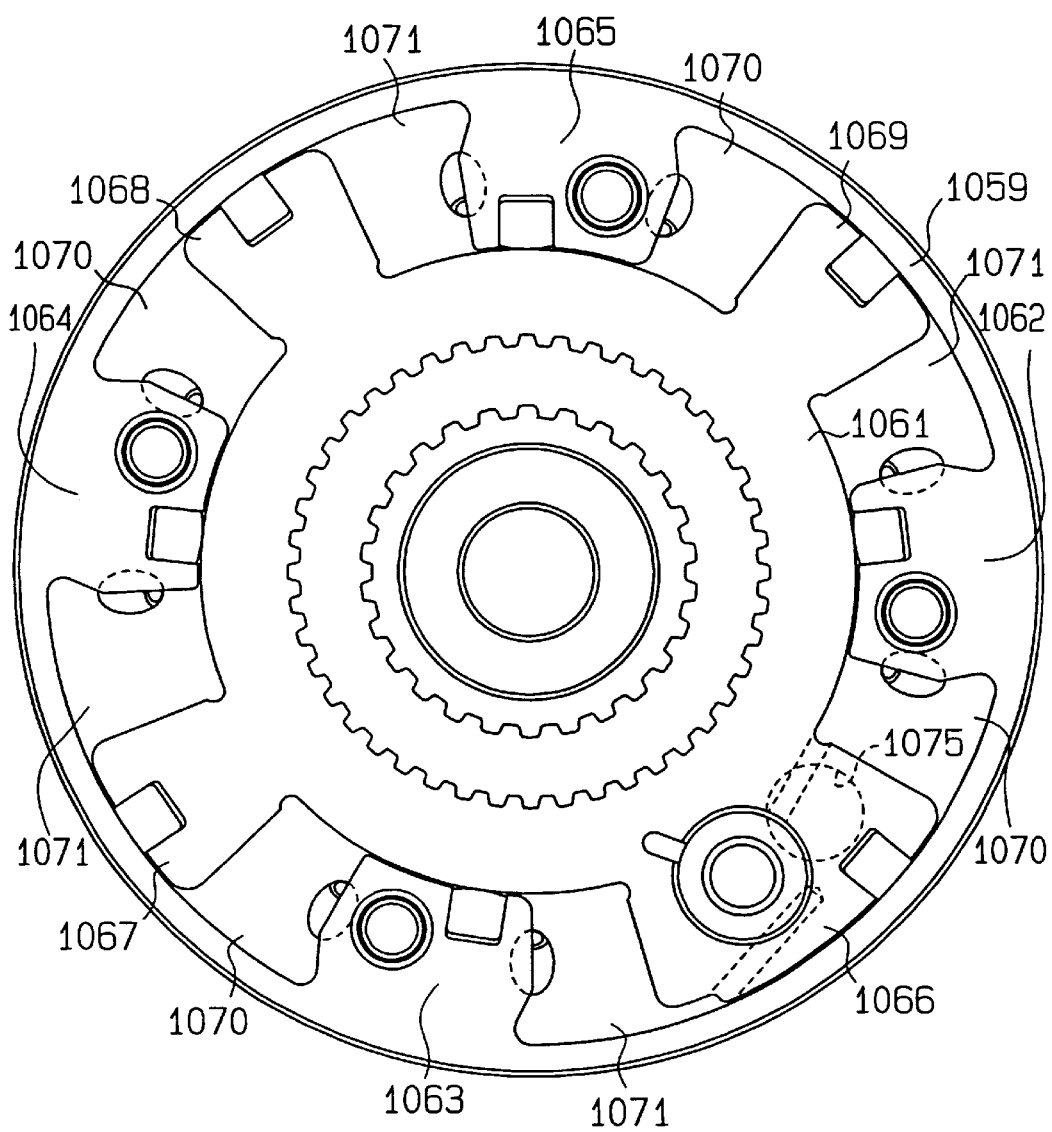
FIG. 24 is a front view illustrating the vane rotor of the mechanism of FIG. 20 with the cover removed.

After the engine 1011 is started, oil is supplied to an annular chamber 1077 from the second pressure chamber 1071 via an oil passage 1076, which disengages the lock pin 1073 from the recess 1075. Specifically, a pressure increase of oil supplied to the annular chamber 1077 disengages the lock pin 1073 from the recess 1075 against the force of the spring 1074. Oil is supplied to the recess 1075 from the first pressure chamber 1070 via an oil passage 1078, which retains the lock pin 1073 at the disengaged position. Disengagement of the lock pin 1073 permits the vane rotor 1061 to rotate relative to the housing 1059. The rotational position of the vane rotor 1061 relative to the housing 1059 is determined in accordance with pressure of the first and second pressure chambers 1070, 1071. For example, the vane rotor 1061 is retained at an advanced position relative to the housing 1059 as illustrated in FIG. 24.

Therefore, when the crankshaft 1015 is rotated by the engine 1011, the rotation is transmitted to the timing pulley 1024a by a timing belt 1026. The timing pulley 1024a and the intake camshaft 1022 are integrally rotated at an adjusted phase. The rotation of the intake camshaft 1022 drives intake valves 1020 (see FIG. 18).

Figure 25A:
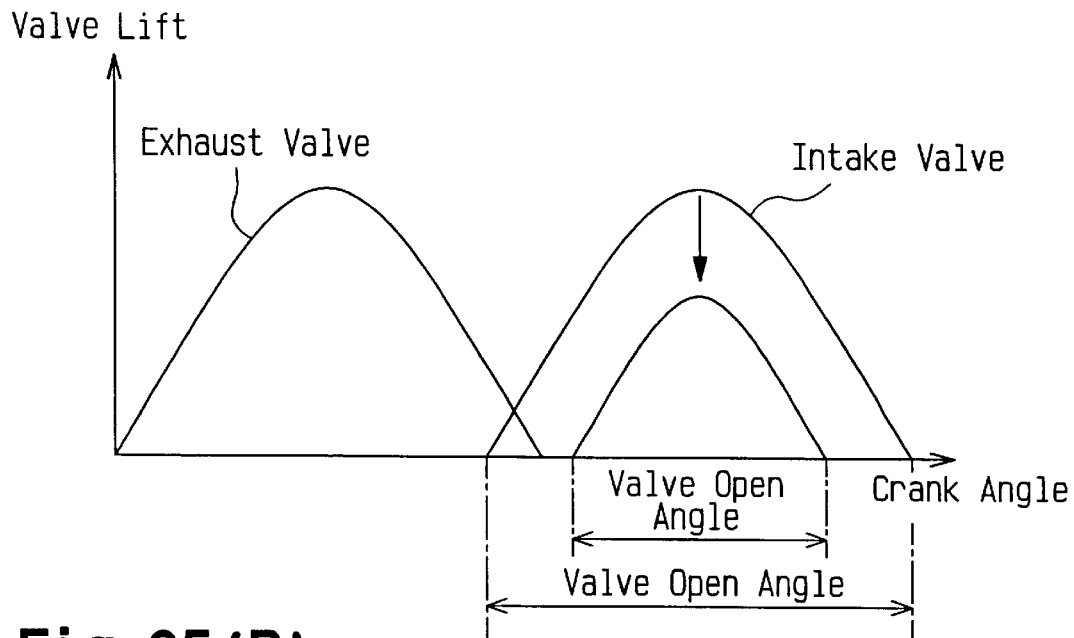
FIGS. 25(A) and 25(B) are graphs showing a relationship between the crank angle and the valve lift for an intake valve and an exhaust valve in the mechanism of FIG. 18.
Figure 25B:
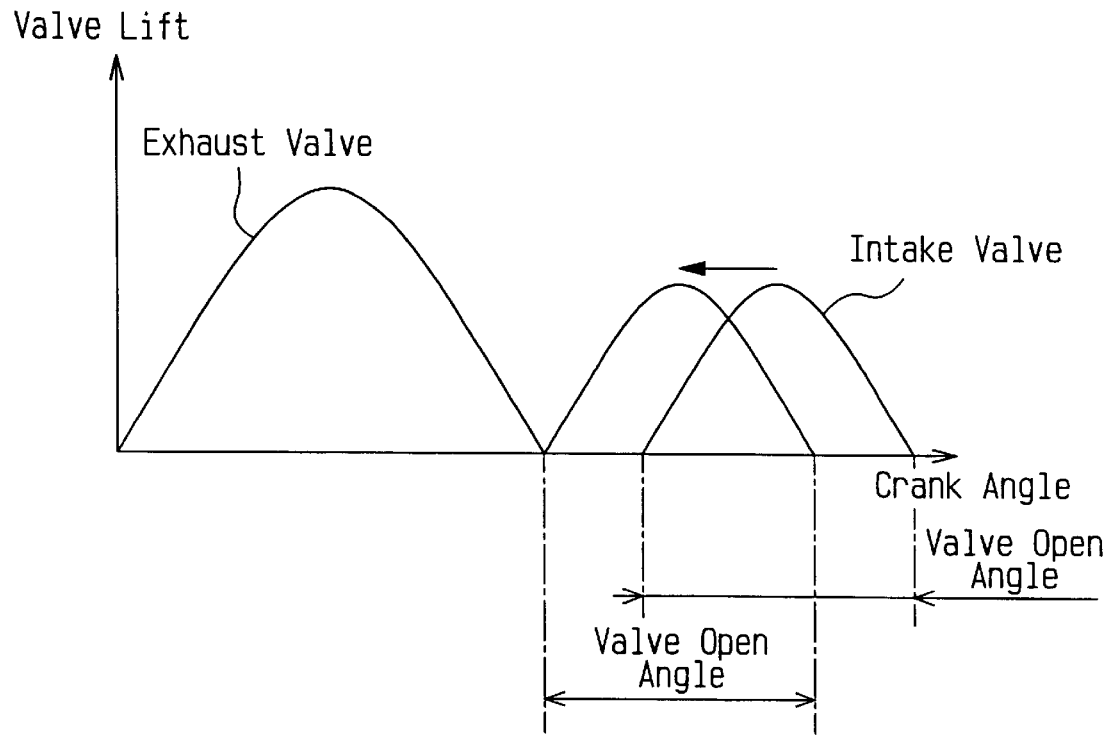

If the rotational phase of the vane rotor 1061 relative to the housing 1059 is advanced by controlling the pressures in the first and second pressure chambers 1070, 1071 when the engine 1011 is running, the rotational phase of the intake camshaft 1022 is advanced relative to that of the crankshaft 1015. Accordingly, the opening and closing timings of the intake valves 1020 are advanced as shown by an arrow in FIG. 25(B) while the valve open angle of the intake valves 1020 is maintained.

If the rotational phase of the vane rotor 1061 relative to the housing 1059 is retarded, the rotational phase of the intake camshaft 1022 is retarded relative to that of the crankshaft 1015. Accordingly, the opening and closing timings of the intake valves 1020 are retarded, or retarded in a direction opposite to the arrow in FIG. 25(B). Specifically, while the valve open angle of the intake valve 1020 does not change, the intake valve timing is retarded.

The oil supply system of the second actuator 1024 will hereafter be described.

The disk 1052 has first openings 1080 and second openings 1081. Each first opening 1080 is connected to one of the first pressure chambers 1070 and each second opening 1081 is connected to one of the second pressure chambers 1071. Recesses 1062a to 1065a are formed in the vicinity of each projection 1062 to 1065 at a part adjacent to the openings 1080. Each recess 1062a to 1065a supplies oil pressure to the first pressure chambers 1070 to advance the rotational phase of the vane rotor 1061 when the first openings 1080 are closed by the vanes 1066 to 1069. Likewise, recesses 1062b to 1065b are formed in the vicinity of the projections 1062 to 1065 adjacent to the second openings 1081. The recesses 1062b to 1065b supply oil to the second pressure chambers 1071 to retard the rotational phase of the vane rotor 1061 when the vanes 1066, 1069 close the second openings 1081.

Each first opening 1080 is connected to a first circumferential groove 1051a formed on the cylindrical boss 1051 via first oil conduits 1084, 1086, 1088. Each second opening 1081 is connected to a second circumferential groove 1051b via second oil conduits 1085, 1087, 1089.

A lubricant passage 1090 is formed in the cylindrical boss 1051. The lubricant passage 1090 is connected to the second oil conduit 1087. A relatively wide inner groove 1091 is formed in the inner surface 1051c of the boss 1051. The groove 1091 is connected to the lubricant passage 1090. Oil in the second conduit 1087 is conducted between the inner surface 1051c of the boss 1051 and the outer surface 1022b of the camshaft 1022 and serves as lubricant.

The first circumferential groove 1051a is connected to a second OCV 1094 by a passage P21 in the cylinder head 1014. The second circumferential groove 1051b is connected to the second OCV 1094 by a passage P22 in the cylinder head 1014.

A supply passage 1095 and a drain passage 1096 are connected to the second OCV 1094. The supply passage 1095 is connected to an oil pan 1013a by the oil pump P, which is also connected to the first OCV 1036. The drain passage 1096 is directly connected to the oil pan 1013a. The oil pump P supplies oil from the oil pan 1013a to the supply passages 1037, 1095.

The second OCV 1094 has the same structure as that of the first OCV 1036. The second OCV 1094 includes a casing 1102, a first oil port 1104, a second oil port 1106, valve bodies 1107, a first drain port 1108, a second drain port 1110, a supply port 1112, a coil spring 1114, an electromagnetic solenoid 1116 and a spool 1118. The first oil port 1104 is connected to the oil passage P21 and the second oil passage 1106 is connected to the oil passage P22. The supply port 1112 is connected to the supply passage 1095 and the first and second drain ports 1108, 1110 are connected to the drain passage 1096.

Therefore, when the solenoid 1116 is de-excited, the first oil port 1104 is connected to the first drain port 1108 and the second oil port 1106 is connected to the supply port 1112. Oil in the oil pan 1013a is supplied to the second pressure chambers 1071 of the second actuator 1024 via the supply passage 1095, the second OCV 1094, the passages P22, the circumferential groove 1051b, the second conduits 1089, 1087, 1085, the second openings 1081, the recesses 1062b, 1063b, 1064b and 1065b. Oil in the first pressure chambers 1070 of the second actuator 1024 is returned to the oil pan 1013a via the grooves 1062a, 1063a, 1064a, 1065a, the first openings 1080, the first conduits 1084, 1086, 1088, the circumferential groove 1051a, the passage P21, the second OCV 1094 and the drain passage 1096. As a result, the rotational phase of the vane rotor 1061 is retarded relative to the housing 1059, which retards the opening and closing timing of the intake valves 1020. In other words, while the valve open angle of the intake valves 1020 does not change, the timing of the intake valves 1020 is retarded.

When the solenoid 1116 is excited, the second oil port 1106 is connected to the second drain port 1110 and the first oil port 1104 is connected to the supply port 1112. In this state, oil in the oil pan 1013a is supplied to the first pressure chambers 1070 in the second actuator 1024 by the supply passage 1095, the second OCV 1094, the passage P21, the circumferential groove 1051a, the first conduits 1088, 1086, 1084, the first openings 1080 and the recesses 1062a, 1063a, 1064a, 1065a. Oil in the second pressure chambers 1071 of the second actuator 1024 is returned to the oil pan 1013a via the recesses 1062b, 1063b, 1064b, 1065b, the second openings 1081, the second conduits 1085, 1087, 1089, the groove 1051b, the passage P22, the second OCV 1094 and the drain passage 1096. As a result, the rotational phase of the vane rotor 1061 is advanced relative to that of the housing 1059. Accordingly, the opening and closing timings of the intake valve 1020 are advanced. That is, the timing of the intake valves 1020 is advanced while open angle does not change.

The first oil port 1104 and second oil port 1106 can be closed by controlling current to the solenoid 1116. Accordingly, oil is not conducted through the oil ports 1104, 1106. In this state, oil is not supplied to or drained from the first and second pressure chambers 1070, 1071. Oil remaining in the chambers 1070, 1071 fixes the rotational phase of the vane rotor 1061 relative to the housing 1059, which maintains the opening and closing timings of the intake valves 1020. In other words, the valve open angle of the intake valves 1020 is not advanced or retarded.

The ECU 1130 controls the first and second OCVs 1036, 1094 thereby controlling the first and second actuators 1022a, 1024. Accordingly, the valve performance of the intake valves 1020 is varied. The ECU 1130 has substantially the same structure as the ECU 180 in the first embodiment except that the ECU 1130 controls both first and second OCVs 1036, 1094.

An electromagnetic pickup 1123 detects the rotational phase of the crankshaft 1015. An electromagnetic pickup 1126 detects the rotational phase and the axial position of the intake camshaft 1022.

Figure 26:
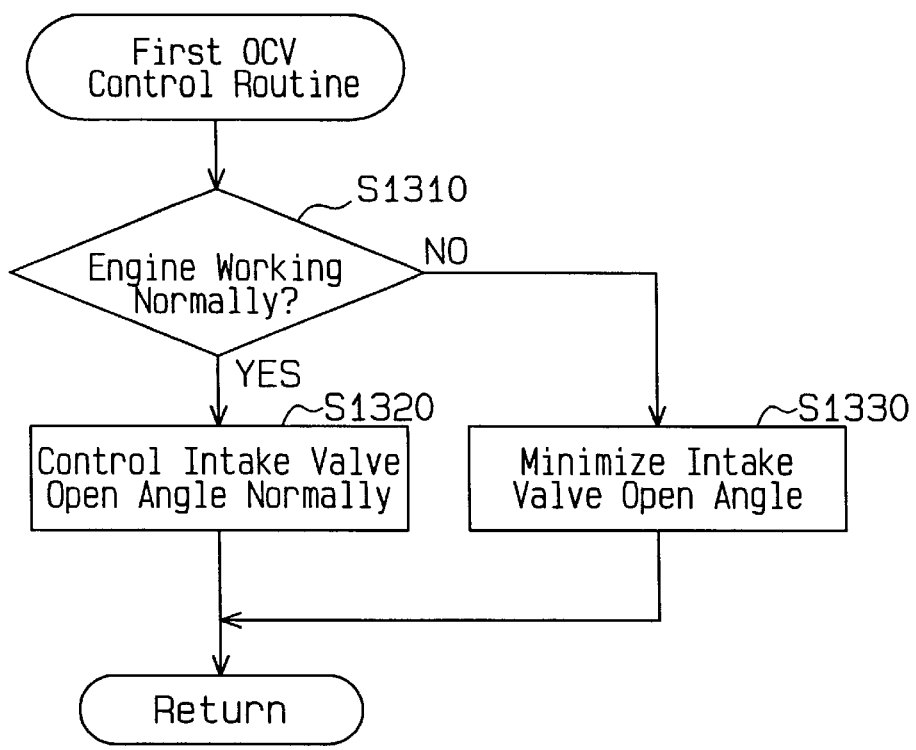
FIG. 26 is a flowchart showing a routine executed by an ECU for controlling the first oil control valve of the valve train shown in FIG. 18.
Figure 27:
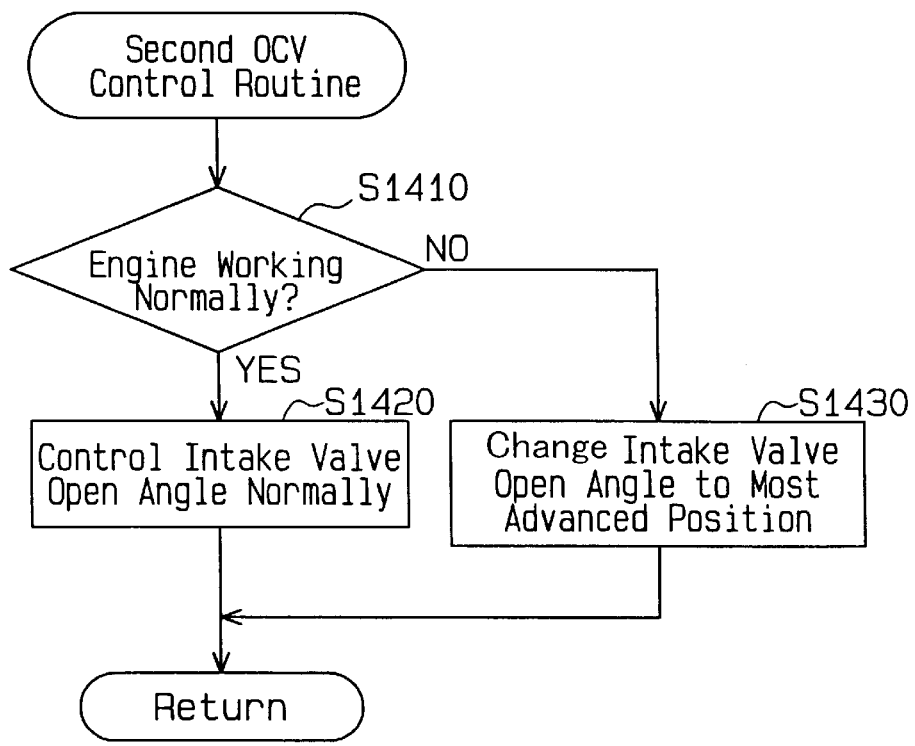
FIG. 27 is a flowchart showing a routine executed by an ECU for controlling the second oil control valve of the valve train shown in FIG. 18.

The ECU 1130 executes routines of FIGS. 26 and 27 at predetermined intervals or at a predetermined crank angles to control the performance of the intake valves 1020.

Referring to FIG. 26, a routine for controlling the first OCV 1036 will be described. When entering the routine of FIG. 26, the ECU 1130 determines if the engine 1011 is running normally as in step S310 of FIG. 7 (step S1310).

Figure 28:
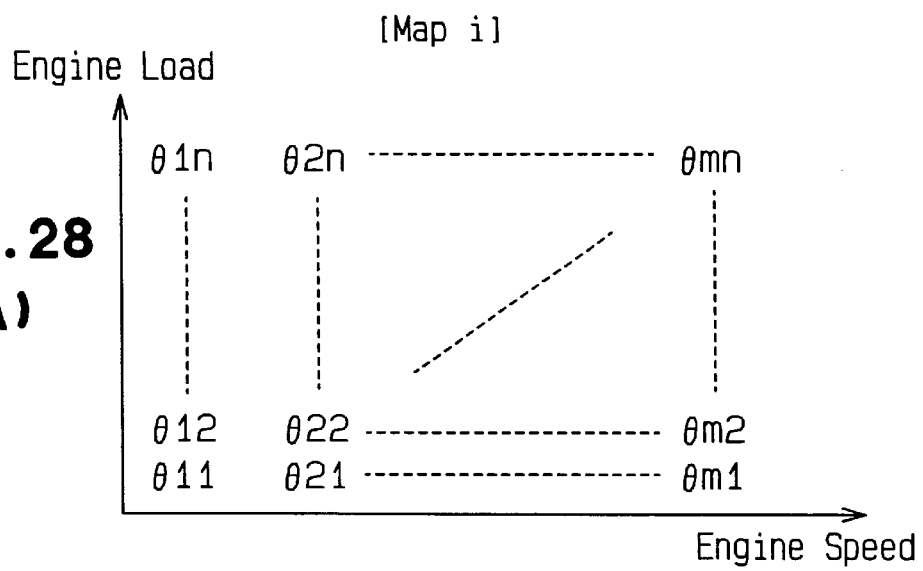
FIGS. 28(A) and 28(B) are maps for determining a target advance angle and a target shaft position of the valve train shown in FIG. 18.
Figure 28:
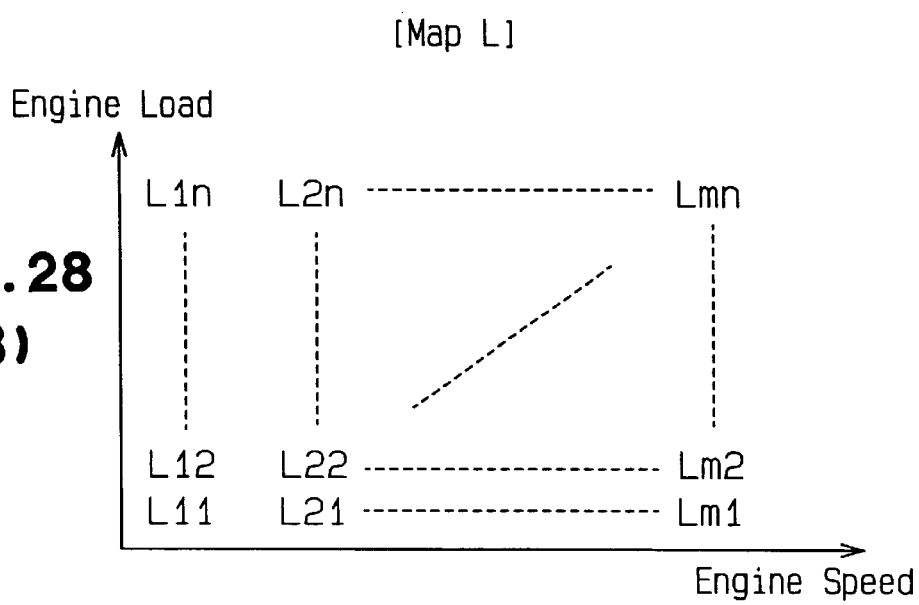

If the engine 1011 is running normally, the ECU 1130 controls the valve open angle of the intake valve 1020 by a normal procedure (step S1320). Specifically, the ECU 1130 determines a target position Lt of the intake camshaft 1022 based on a map L of FIG. 28(B). The map L of FIG. 28(B) uses the engine speed and the engine load (for example, intake pressure, intake amount or injection amount is used as a value to represent the engine load). The ECU 1130 controls the first actuator 1022a such that the actual position of the intake camshaft 1022 matches the target shaft position Lt. The map L is designed such that an optimum valve open angle of the intake valves 1020 is selected for a required performance of the engine 1011.

If there is a malfunction in the engine 1011, the ECU 1130 controls the first actuator 1022a to move the intake camshaft 1022 such that the valve open angle of the intake valves 1020 is minimized (step S1330).

Referring to FIG. 27, a control of the second OCV 1094 will be described. As in step S1310 above, the ECU 1130 judges whether the engine 1011 is running normally (step S1410).

If the engine 1011 is running normally, the ECU 1130 controls the phase of the valve open angle of the intake valves 1020 by the normal procedure (step S1420). Specifically, the ECU 1130 determines a target advance degree θt of the valve open angle based on a map i of FIG. 28(A) and feedback controls the valve open angle of the intake valves 1020. The map i FIG. 28(A) uses the engine speed and the engine load (for example, intake pressure, intake amount or injection amount is used as a value to represent the engine load). The ECU 1130 controls the second actuator 1024 such that the actual valve open angle of the intake valve 1020 matches the target angle θt. The map i is designed such that an optimum valve open angle of the intake valves 1020 is selected for a required performance of the engine 1011.

If there is a malfunction in the engine 1011, the ECU 1130 controls the second actuator 1024 to shift the rotational phase of the intake camshaft 1022 such that the valve open angle of the intake valves 1020 is most advanced (step S1430). Accordingly, the valve performance shown in FIG. 8(A) is obtained. Thus, the eleventh embodiment has the same advantages as the second embodiment.

The second OCV 1094 may be controlled by the normal procedure even if there is a malfunction in the engine 1011. In this case, only the first OCV 1036 is controlled. Therefore, this embodiment still has the same advantages as the first embodiment.

The OCVs 1036, 1094 may be moved in opposite directions when there is a malfunction in the engine 1011. In this case, the eleventh embodiment has the same advantages as the third embodiment. Further, the OCVs 1036 and 1094 may be controlled to operate the intake valves 1020 in the manner of the fourth and fifth embodiments.

Figure 29:
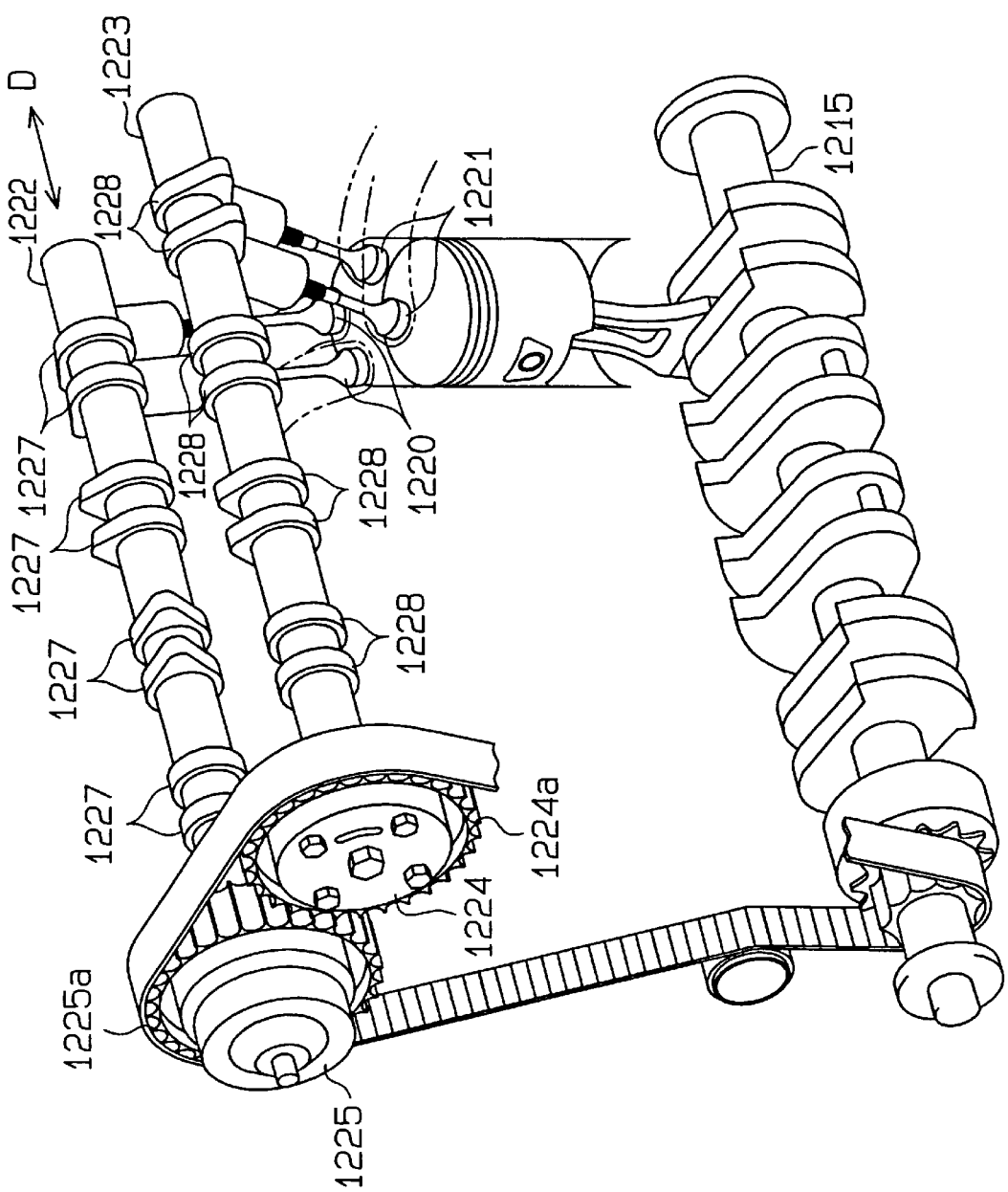
FIG. 29 is a perspective view illustrating a variable performance valve train according to a twelfth embodiment of the present invention.

A twelfth embodiment of the present invention will now be described. As shown in FIG. 29, the twelfth embodiment is different from the eleventh embodiment in that a first actuator 1225 is attached to a timing pulley 1225a of an exhaust camshaft 1222. Further, the exhaust camshaft 1222 is rotatably supported by a cylinder head. The exhaust camshaft 1222 is permitted to move axially, or in a direction shown by arrow D. Exhaust cams 1227 are three-dimensional. An intake camshaft 1223 is not axially moved, and the intake cams 1228 are normal cams. The rotational phase of he intake cams 1228 can be changed by the actuator 1224.

Figure 30A:
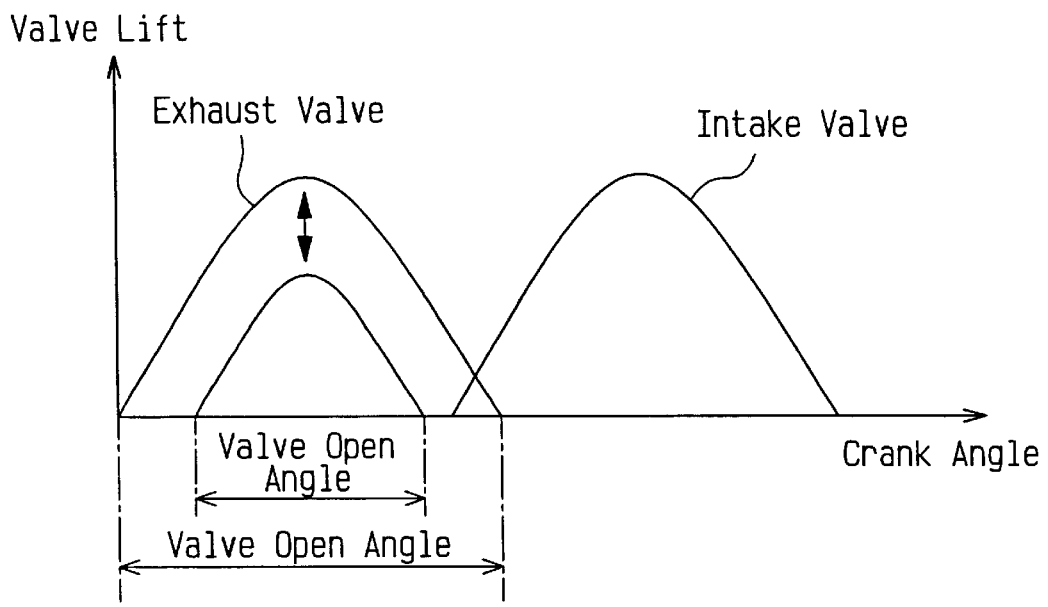
FIGS. 30(A) and 30(B) are graphs showing a relationship between the crank angle and the valve lift for an intake valve and an exhaust valve of the valve train shown in FIG. 29.
Figure 30B:
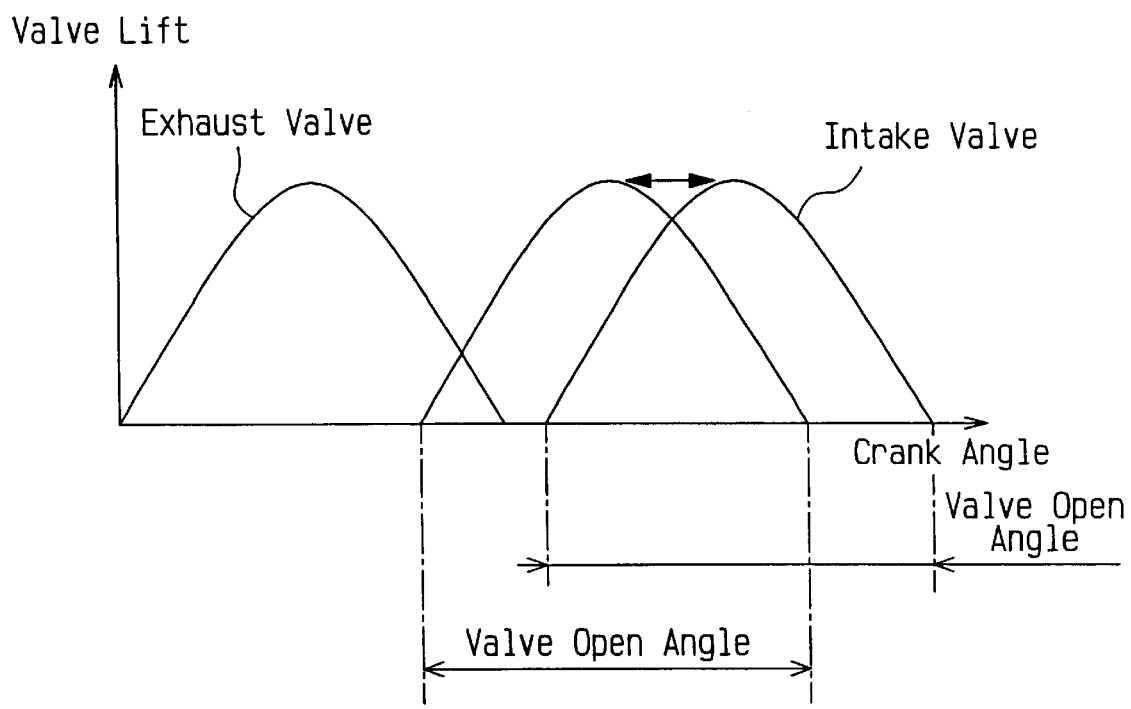
Figure 31:
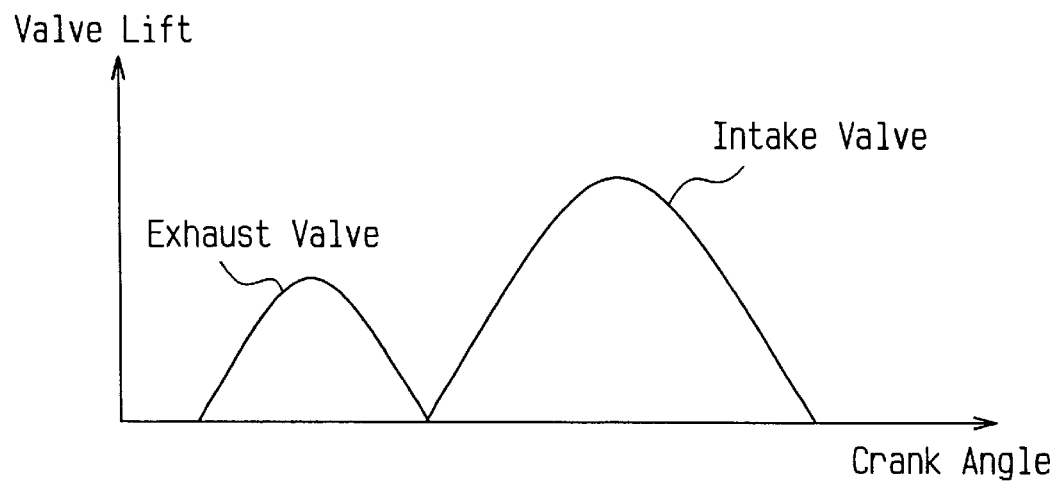
FIGS. 31 is a graph showing a relationship between the crank angle and the valve lift for an intake valve and an exhaust valve of the valve train shown in FIG. 29 when there is a malfunction in the engine.

A first OCV controls the axial position of the exhaust camshaft 1222 to vary the valve open angle of the exhaust valves 1220 as shown in FIG. 30(A). A second OCV controls the rotational phase of the intake camshaft 1223 relative to that of a crankshaft 1215 thereby adjusting the valve timing of the intake valves 1221.

The ECU 1130 executes a routine like the routine of FIG. 26 to control the exhaust valves 1220. Specifically, when there is a malfunction in the engine, the ECU 1130 minimizes the valve open angle of the exhaust valves 1220. Also, the ECU 1130 rotates the intake camshaft 1223 to the most advanced rotational phase as in the routine of FIG. 27.

If there is a malfunction in the engine, the opening timing of the exhaust valves 1220 is most retarded and there is no valve overlap, which stabilizes the engine speed. Also, the closing timing of the intake valves 1221 is most advanced, which facilitates the starting of the engine.

Figure 32:
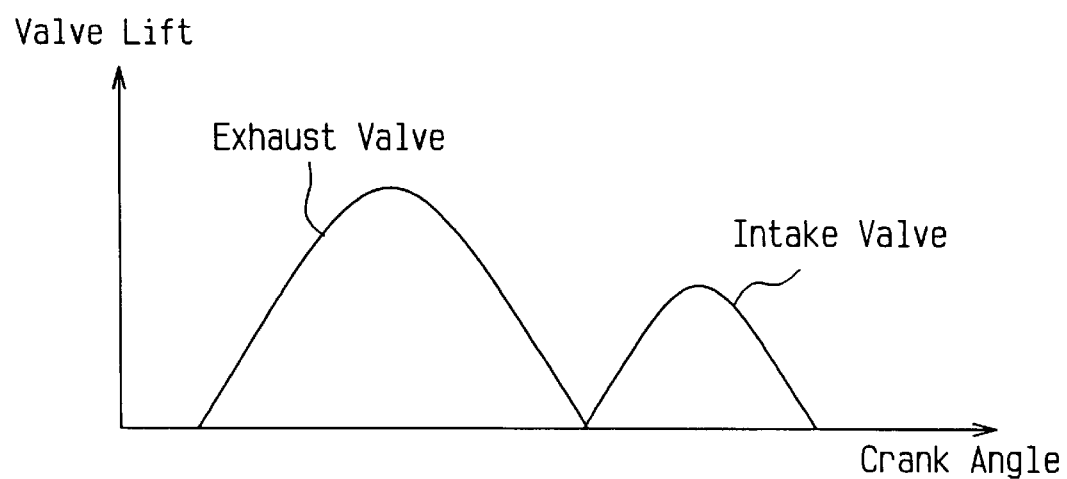
FIGS. 32 is a graph showing a relationship between the crank angle and the valve lift for an intake valve and an exhaust valve of a variable performance valve train according to another embodiment of the present invention when there is a malfunction in the engine.

The first and second actuators 1225, 1224 may both be attached to the exhaust camshaft 1222. In this case, the valve performance of the exhaust valves 1220 is variable as the valve performance of the intake valves 1221 of FIGS. 25(A) and 25(B), and the valve performance of the intake valves 1221 is invariable as the valve performance of the exhaust valves 1220 of FIGS. 25(A) and 25(B). Alternatively, the second actuator 1224 may be attached to the exhaust camshaft 1222 and the first actuator 1225 may be attached to the intake camshaft 1223. In this case, valve performance shown will be as in FIG. 32 when there is a malfunction in the engine. This embodiment therefore has the same advantages as the twelfth embodiment.

A thirteenth embodiment will now be described. The thirteenth embodiment has the same structure as the first embodiment. However, the ECU 201 may be omitted. The thirteenth embodiment is designed to deal with a malfunction in the hydraulic system, which includes the pump P and the OCV 170.

If there is a break in wires that connect the ECU 180 to the solenoid 136 of the OCV 170, electricity cannot be supplied to the solenoid 136. In this case, the ECU 180 is unable to control the solenoid 136. As a result, the spool 138 remains at the default position shown in FIG. 3.

Thus, each cam follower 21a a contacts the smallest profile section of the associated intake cam 28. The smallest profile section of the intake cam 28 is the default position. Therefore, if no electricity is supplied to the solenoid 136 due to a malfunction, the performance of the intake valves 21 is as shown in FIG. 6(A). Specifically, the valve lift of the intake valves 21 is minimum and there is no valve overlap.

If the oil pump P malfunctions or if a pipe connecting the oil pump P with the OCV 170 is broken, no pressurized oil is supplied to the actuator 25.

In this state, the ring gear 162 receives no pressure either from the first oil chamber 165 or from the second oil chamber 166. Therefore, the ring gear 162 cannot maintain the axial position of the intake camshaft 23.

However, since the surface of the nose of each intake cam 28 is inclined, the camshaft 23 receives a leftward force (as viewed in FIG. 3) from the cam followers 21a.

Accordingly, the ring gear 162 is moved leftward with the intake camshaft 23, which maintains intake camshaft 23 at the default position as illustrated in FIG. 3. Therefore, if oil is not supplied to the actuator 25 due to a malfunction, the performance of the intake valves 21 is maintained in a state shown in FIG. 6(A). That is, the valve lift of each intake valve 21 is minimum and there is no valve overlap.

In this manner, if electricity to the solenoid 136 is stopped or if oil pressure is not supplied to the actuator 25 due to malfunction, the intake camshaft 23 is maintained at the default position of FIG. 3. Therefore, in either case, the valve lift and the opening timing of the intake valves 21 are the same. In other words, the two types of malfunctions can be dealt with by one fail-safe procedure. As a result, the development procedure of programs stored in the ROM 183 and the required capacity of the ROM 183 are reduced.

In either type of malfunction, there is no valve overlap, which stabilizes the speed of the engine 11. Further, the valve lift is maintained minimum and the closing timing of the intake valves 21 is the most advanced. Starting of the engine is therefore facilitated, which allows the driver to quickly take steps to have the vehicle serviced.

A fourteenth embodiment of the present invention will now be described with reference to FIGS. 1 to 5. The fourteenth embodiment is the same as the thirteenth embodiment except that the outer teeth 163 of the ring gear 162 and the inner teeth 157 on the cover 154 are replaced with left-handed helical teeth. When moved rightward in FIG. 3, the intake camshaft 23 rotates counterclockwise relative to the cover 154 when viewed from the left side of FIG. 3.

When the solenoid 136 is de-excited, the ring gear 162 is moved leftward with the intake camshaft 23 as shown in FIG. 3. At this time, the valve lift and the valve open angle of the intake valves 21 are small. Cooperation of the helical outer and inner teeth (not shown) displaces the rotational phase of the intake camshaft 23 to the most advanced position relative to the cover 154. Therefore, as shown in FIG. 8(A), the valve overlap between the intake valves 21 and the exhaust valves 20 is maximized.

When the solenoid 136 is excited, the ring gear 162 is moved in the direction of arrow A with the intake camshaft 23 as illustrated in FIG. 4, which increases the valve lift and the valve open angle of the intake valves 21. Cooperation of the helical outer and inner teeth retards the rotational phase of the intake camshaft 23 relative to the cover 154. As a result, the valve overlap between the intake valves 21 and the exhaust valves 20 becomes zero as shown in FIG. 8(B).

If the supply of electricity to the solenoid 136 is stopped due to a malfunction, the spool 138 is maintained at the leftmost position in the casing by the force of the coil spring 134 as illustrated in FIG. 3. In this state, each intake cam 28 contacts the associated cam follower 21a at the smallest profile section (default position). Therefore, the valve lift of the intake valves 21 is the smallest and the closing timing Ci of the valves 21 is most retarded as shown in FIG. 8(A).

If oil pressure is not supplied to the actuator 25 due to a malfunction, the ring gear 162 receives no oil pressure either from the first oil pressure chamber 165 or the second oil pressure chamber 166. However, the intake camshaft 23 receives a leftward force (as viewed in FIG. 3) at the contacting surface between the nose of each intake cam 28 and the associated cam follower 21a.

As described above, in this embodiment, the outer teeth 163 and the inner teeth 157 are replaced with left-handed helical teeth. The camshaft 23 receives friction force from a journal bearing (not shown) located on the cylinder head 14 and each intake cam 28 receives friction force from the associated cam follower 21a. Due to the friction forces, the intake camshaft 23 receives a force in the direction of arrow A from the inner helical teeth of the cover 154.

The angle of the cam surface of the intake cams 28 and the helical angle of the inner and outer teeth are determined such that the total leftward forces are greater than the axial forces in the direction of arrow A.

Accordingly, the ring gear 162 and the intake camshaft 23 are moved leftward by default. The intake camshaft 23 is maintained at the smallest profile section (default position) as illustrated in FIG. 3. As shown in FIG. 8(A), the valve lift of the intake valves 21 is the smallest and the closing timing of the intake valves 21 is most retarded.

In this manner, even if electricity to the solenoid 136 is stopped or even if oil pressure is not supplied to the actuator 25 due to a malfunction, the intake camshaft 23 is stabilized at the default position. Further, when there is a malfunction, the valve lift of the intake valves 21 is the smallest and the closing timing Ci is most advanced, which facilitates the starting of the engine 11.

A variable performance valve train according to a fifteenth embodiment will now be described with reference to FIGS. 33 and 34.

The fifteenth embodiment is different from the fourteenth embodiment in that the magnitudes of opposite forces that act on the ring gear 162 when the ring gear 162 receives no oil pressure are opposite from those in the fourteenth embodiment. Specifically, the angle of the cam surface of each intake cam 28 and the helical angle of the inner and outer teeth are determined such that a force urging the intake camshaft in the direction of arrow A is stronger than an opposite force. A further difference is that the oil passage P11 from the first oil port 118 is connected to the second oil chamber 166 and the oil passage P12 from the port 120 is connected to the first oil chamber 165. As in the fourteenth embodiment, the outer teeth 163 of the ring gear 162 and the inner teeth 157 of the cover 154 are replaced by helical teeth (not shown).

When the solenoid 136 is de-excited, oil is supplied from the port 120 to the first oil chamber 165 as shown in FIG. 33, which moves the ring gear 162 and the intake camshaft 23 in the direction of arrow A. As a result, each intake cam 28 contacts the associated cam follower 21a at the largest profile section, which increases the valve lift and the valve open angle of the intake valves 21. Cooperation of the helical outer and inner teeth shifts the rotational phase of the intake camshaft 23 to the most retarded position relative to the cover 154. Therefore, as shown in FIG. 8(B), the valve lift of the intake valves 21 is maximized and the valve overlap is set to zero.

Figure 34:
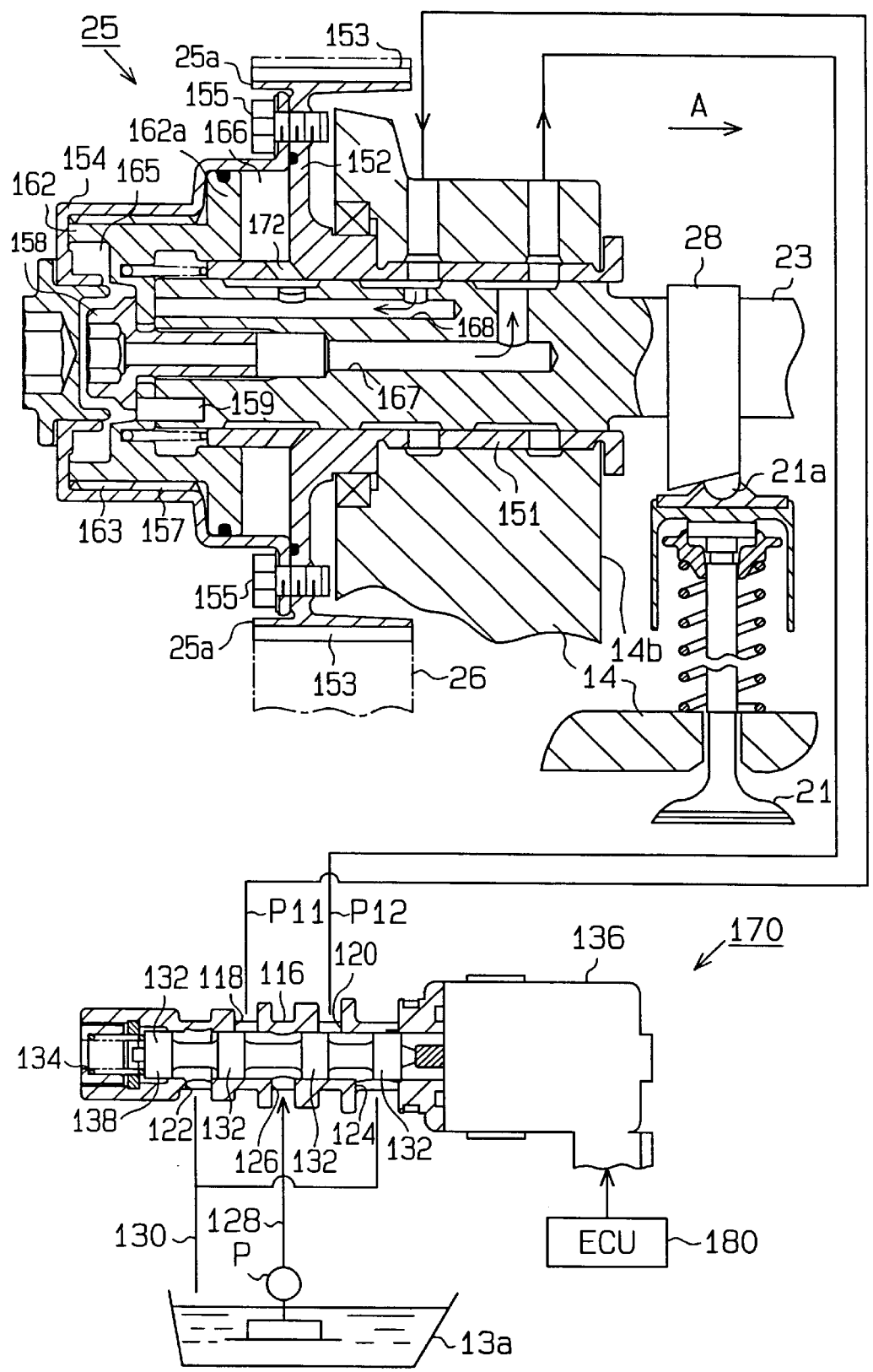
FIG. 34 is a diagrammatic cross-sectional view illustrating an operational state of the actuator and the control valve of FIG. 33.

When the solenoid 136 is excited, the ring gear 162 is moved leftward with the intake camshaft 23 as illustrated in FIG. 34. As a result, each intake cam 28 contacts the cam follower 21a at the smallest profile section, which decreases the valve lift and the valve open angle of the intake valves 21. The cooperation of the helical outer and inner teeth shifts the intake camshaft 23 to the most advanced phase position relative to the cover 154. As a result, the valve lift of the intake valves 21 is minimized and the valve overlap between the intake valves 21 and the exhaust valves 20 is maximized.

If the supply of electricity to the solenoid 136 is stopped due to a malfunction, the spool 138 remains at the rightmost position in the casing by the force of the coil spring 134 as illustrated in FIG. 33. In this state, each intake cam 28 contacts the associated cam follower 21a at the largest profile section (default position). Therefore, the valve lift of the intake valves 21 is the maximum and there is no valve overlap as shown in FIG. 8(B).

If oil pressure is not supplied to the actuator 25 due to a malfunction, the intake camshaft 23 receives forces in opposite axial directions as in the fourteenth embodiment. Specifically, the intake camshaft 23 receives a leftward force from the cam follower 21a and a rightward force from the helical inner teeth of the cover 154.

As described above, the rightward force is greater than the leftward force, which moves the ring gear 162 and the intake camshaft 23 rightward. Accordingly, the intake camshaft 23 is maintained at the default position of FIG. 33. The valve lift of the intake valve 21 is maximum and the valve overlap is zero as shown in FIG. 8(B).

In this manner, if electricity to the solenoid 136 is stopped or if oil pressure is not supplied to the actuator 25 due to malfunction, the intake camshaft 23 is stabilized at the default position and the valve overlap is set to zero as shown in FIG. 8(B). Accordingly, the engine speed is stabilized.

A sixteenth embodiment will now be described with reference to FIGS. 3 to 5. The valve train of the sixteenth embodiment is the same as the valve train of the fourteenth embodiment except that the outer teeth 163 and the inner teeth 157 are replaced with right handed helical teeth (not shown).

When the solenoid 136 is de-excited, the ring gear 162 and the intake camshaft 23 are moved leftward as illustrated in FIG. 3, which decreases the valve lift and the valve open angle the intake valves 21. Cooperation of the helical outer and inner teeth shifts the rotational phase of the intake camshaft 23 to the most retarded position relative to the cover 154. Therefore, as shown in FIG. 10(A), the valve lift of the intake valves 21 is the smallest and is most retarded relative to the exhaust valve 20. Accordingly, the valve overlap is set to zero.

When the solenoid 136 is excited, the ring gear 162 is moved rightward with the intake camshaft 23 as illustrated in FIG. 4, which increases the valve lift and the valve open angle of the intake valves 21. Cooperation of the helical outer and inner teeth shifts the rotational phase of the intake camshaft 23 to the most advanced position relative to the cover 154. As a result, the valve lift of the intake valves 21 is the greatest and is most advanced relative to the exhaust valve 20. The valve overlap is therefore maximized.

If the supply of electricity to the solenoid 136 is stopped due to a malfunction, the spool 138 is maintained at the rightmost position in the casing by the coil spring 134 as illustrated in FIG. 3. In this state, each intake cam 28 contacts the associated cam follower 21a at the smallest profile section (default position). Therefore, the valve lift of the intake valves 21 is minimum and there is no valve overlap as shown in FIG. 10(A).

If oil pressure is not supplied to the actuator 25 due to a malfunction, the intake camshaft 23 receives a leftward force as a result of contact between the cam 28 and the cam follower 21a.

The inner teeth of the cover 154 and the outer teeth of the ring gear 162 are right-handed helical teeth. The camshaft 23 receives a friction force from a journal bearing (not shown) located on the cylinder head 14 and each intake cam 28 receives a friction force from the associated cam follower 21a. Due to the friction forces, the intake camshaft 23 receives a rightward force from the inner teeth 157 of the cover 154. These two forces move the intake camshaft 23 leftward.

Accordingly, the ring gear 162 and the intake camshaft 23 are moved leftward and the intake camshaft 23 is maintained at the default position shown in FIG. 3. As shown in FIG. 10(A), the valve lift of the intake valves 21 is minimized and the valve overlap is zero.

In this manner, if electricity to the solenoid 136 is stopped or if oil pressure is not supplied to the actuator 25 due to a malfunction, the valve overlap is set to zero as shown in FIG. 10(A). Accordingly, the engine speed is stabilized.

A seventeenth embodiment of the present invention will now be described with reference to FIGS. 35 and 36. The seventeenth embodiment is different from the sixteenth embodiment in that a spring 200 is located in the first oil pressure chamber 165. The spring 200 urges the intake camshaft 23 rightward. The force of the spring 200 is greater than the resultant force urging the intake camshaft 23 leftward. Another difference is that an oil passage P21 from the first oil port 118 is connected to the second pressure chamber 166, and the oil passage P22 from the port 120 is connected to the first pressure chamber 165.

When the solenoid 136 is de-excited, the ring gear 162 and the intake camshaft 23 are moved in a direction of arrow A as illustrated in FIG. 35. As a result, the valve lift and the valve open angle of the intake valves 21 are increased. The cooperation of the helical outer and inner teeth shifts the rotational phase of the intake camshaft 23 to the most advanced position relative to the cover 154. Therefore, as shown in FIG. 10(B), the valve lift of the intake valves 21 is maximized and the opening timing of the intake valves Ci is most advanced.

Figure 36:
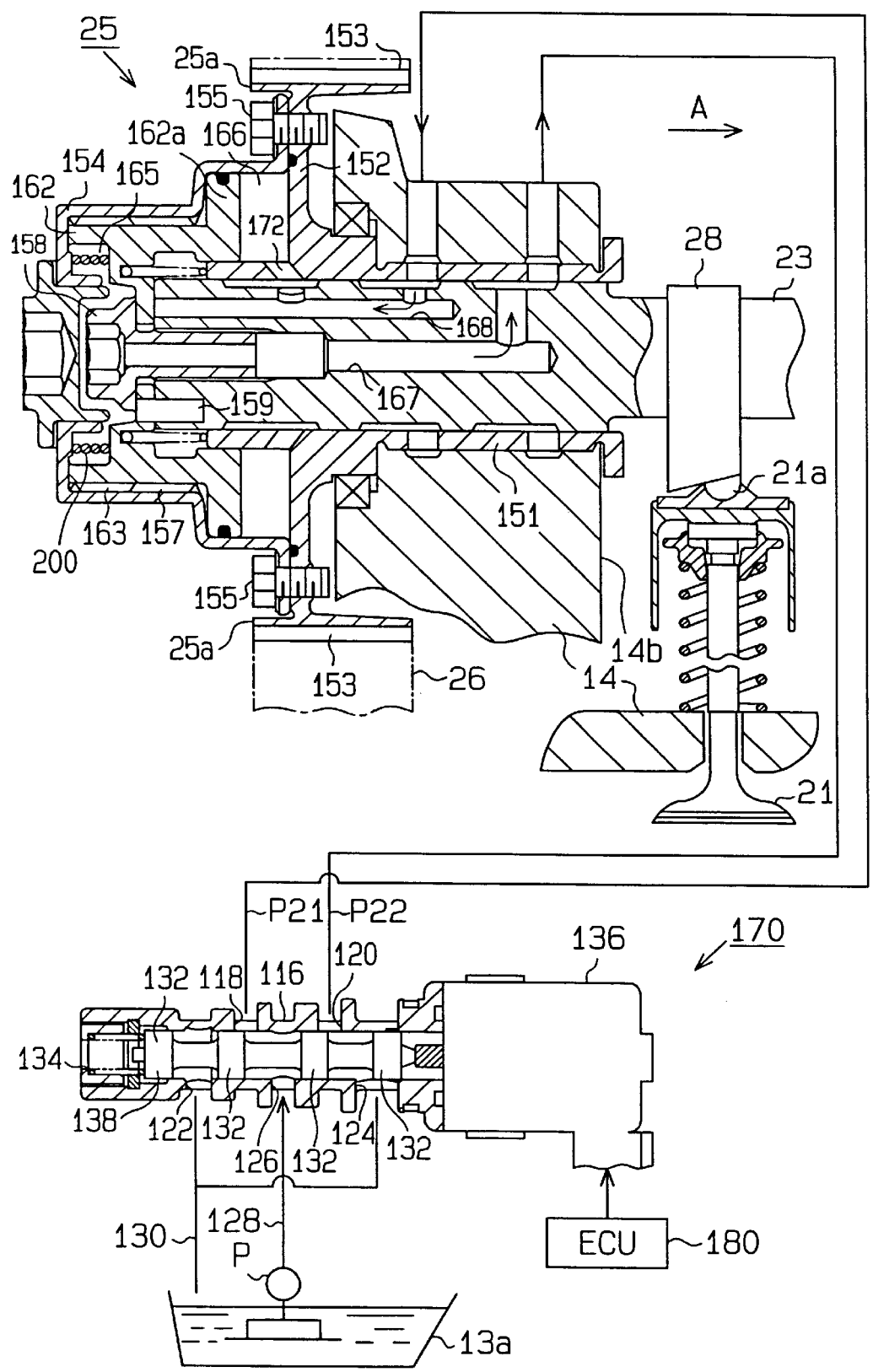
FIG. 36 is a diagrammatic cross-sectional view illustrating an operational state of the actuator and the control valve of FIG. 35.
Figure 37:
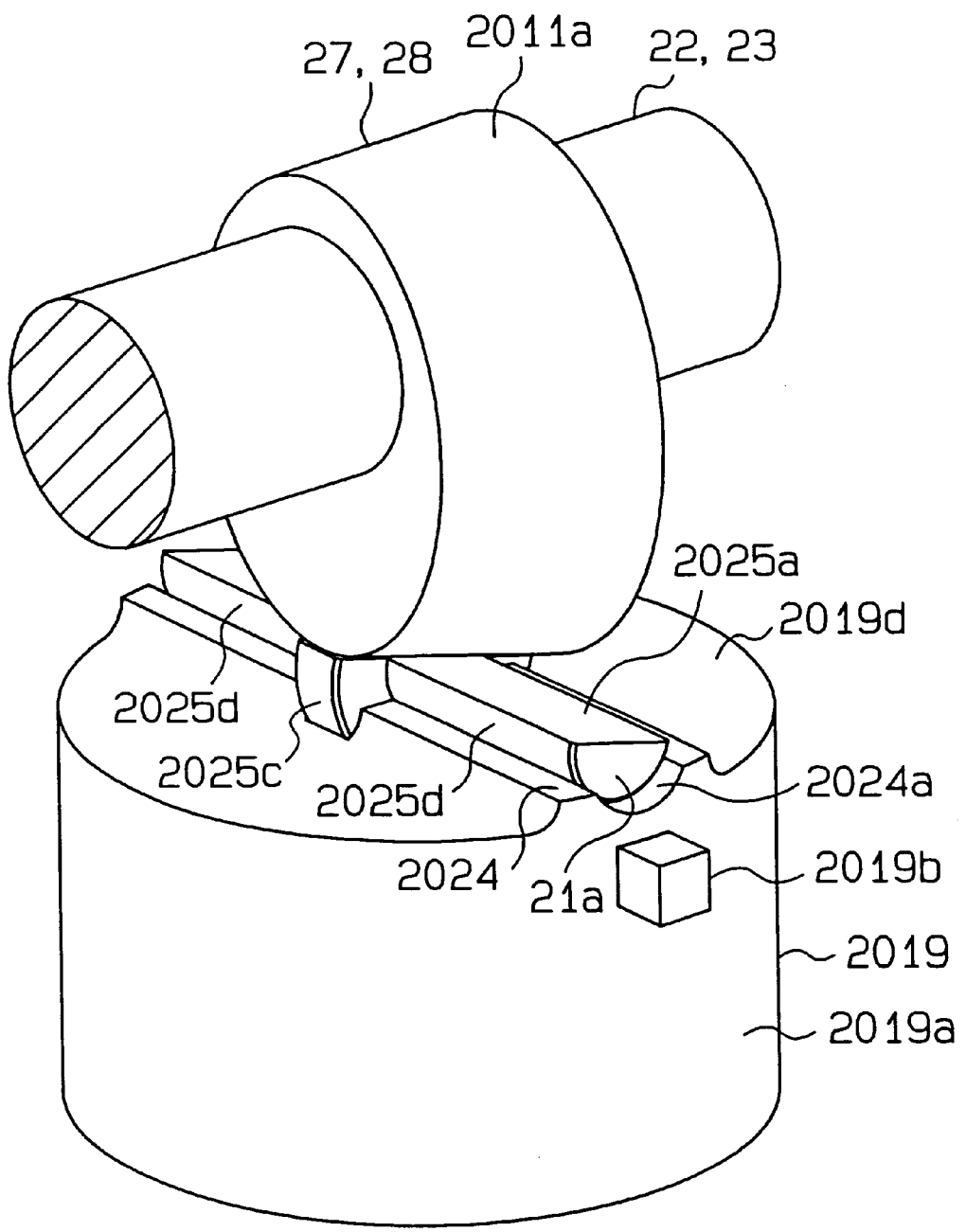
FIG. 37 is a perspective view illustrating a cam follower mechanism for an intake cam or an exhaust cam.

When the solenoid 136 is excited, the ring gear 162 and the intake camshaft 23 are moved leftward as shown in FIG. 36. As a result, the valve lift and the valve open angle of the intake valve 21 are decreased. The cooperation of the helical outer and inner teeth shifts the rotational phase of the intake camshaft 23 to the most retarded position relative to the cover 154. Therefore, as shown in FIG. 10(A), the valve lift of the intake valve 21 is the smallest and the valve overlap is set to zero.

If the supply of electricity to the solenoid 136 is stopped due to a malfunction, the spool 138 is maintained at the rightmost position in the casing. In this state, each intake cam 28 contacts the associated cam follower 21a at the maximum profile section (default position). Therefore, the valve lift of the intake valves 21 is the maximum and the closing timing Ci of the intake valves 21 most advanced as shown in FIG. 10(B).

If oil pressure is not supplied to the actuator 25 due to a malfunction, the intake camshaft 23 receives a leftward force from the cam follower 21a and the inner teeth 157 of the cover 154 as in the sixteenth embodiment. Since the force of the spring 200 is greater than the resultant of the forces of the cam follower 21a and the inner teeth 157, the ring gear 162 and the intake camshaft 23 are moved rightward. As a result, the intake camshaft 23 is stabilized at the default position as illustrated in FIG. 35. As shown in FIG. 10(B), the valve lift of each intake valve 21 is maximized and the closing timing is most advanced.

In this manner, if electricity to the solenoid 136 is stopped or if oil pressure is not supplied to the actuator 25 due to a malfunction, the intake camshaft 23 is maintained at the default position. As illustrated in FIG. 10(B), the closing timing of the intake valves 21 is most advanced, which facilitates the starting of the engine. Therefore, the engine 11 can be quickly restarted after being stopped due to a malfunction.

It should be apparent to those skilled in the art that the present invention may be embodied in many other specific forms without departing from the spirit or scope of the invention. Particularly, it should be understood that the invention may be embodied in the following forms.

In the thirteenth to seventeenth embodiments, the exhaust cams 27 may be three-dimensional and the actuator 25 may be attached to the exhaust camshaft 22. If these changes are applied to the thirteenth embodiment, the valve performance of the exhaust valves 20 is changed to that illustrated in FIGS. 13(A) and 13(B). In this manner, if electricity to the solenoid 136 is stopped or if oil pressure is not supplied to the actuator 25 due to a malfunction, the exhaust camshaft 22 is maintained at the default position. At this time, the exhaust valves 20 have the performance illustrated in FIG. 13(A). The opening timing of the exhaust valves 20 is most retarded and there is no valve overlap, which stabilizes the engine speed.

If the actuator 25 of the fourteenth embodiment is used for the exhaust camshaft 22, the exhaust valves 20 have the performance shown in FIG. 17(A). In this case, the valve overlap of the exhaust valve 20 is set to zero, which stabilizes the speed of the engine 11.

If the actuator 25 of the fifteenth embodiment is used for the exhaust camshaft 22, the exhaust valves 20 have the performance shown in FIG. 17(B). In this case, the opening timing of the exhaust valves 20 is most retarded, which stabilizes the engine speed.

If the actuator 25 of the sixteenth embodiment is used for the exhaust camshaft 22, the exhaust valves 20 have the performance shown in FIG. 17(A). In this case, the opening timing of the exhaust valves 20 is most retarded, which stabilizes the engine speed.

If the actuator 25 of seventeenth embodiment is used for the exhaust camshaft 22, the exhaust valves 20 have the performance shown in FIG. 17(B). In this case, the valve overlap is set to zero, which stabilizes the speed of the engine 11.

The default position of the intake camshaft 23 in case of a malfunction according to the fourteenth embodiment is opposite to that in to the fifteenth embodiment. One of these default positions is selected depending on the type of the engine 11 when designing the engine 11. Selecting one of the sixteenth and seventeenth embodiments is determined in the same manner. The valve performance of the exhaust camshaft 22 is also determined depending on the type of the engine 11.

In the thirteenth to sixteenth embodiments, the spring 200 of the seventeenth embodiment may be employed. In this case, the intake camshaft 23 is quickly moved to the default position when there is oil pressure acting on the actuator 25.

In the thirteenth to seventeenth embodiments, both exhaust and intake camshaft 22, 23 may have three-dimensional cams and the actuator 25.

Figure 38:
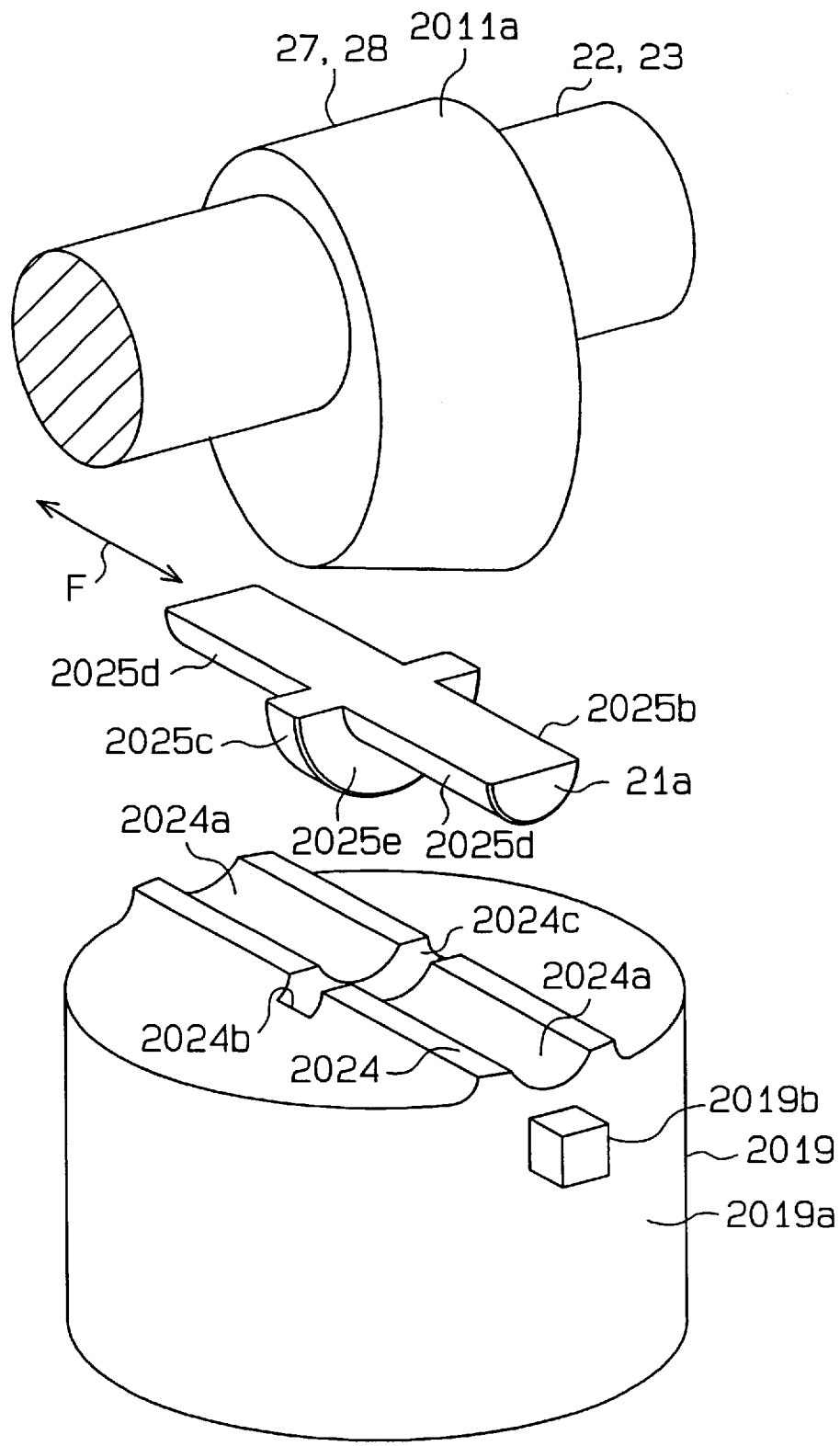
FIG. 38 is a perspective exploded view showing the cam follower of FIG. 37.
Figure 39:
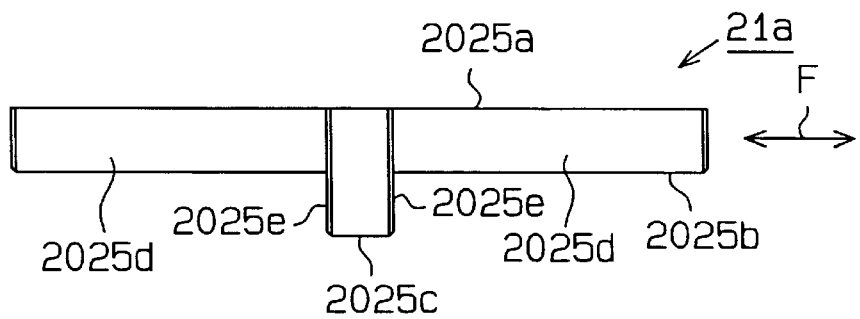
FIG. 39(A) is a front view showing the cam follower of the mechanism shown in FIG. 37.
FIG. 39(B) is a top plan view showing the cam follower of FIG. 39(A)
FIG. 39(C) is a right side view showing the cam follower of FIG. 39(A)
FIG. 39(D) is a bottom view showing the cam follower of FIG. 39(A)
Figure 39:
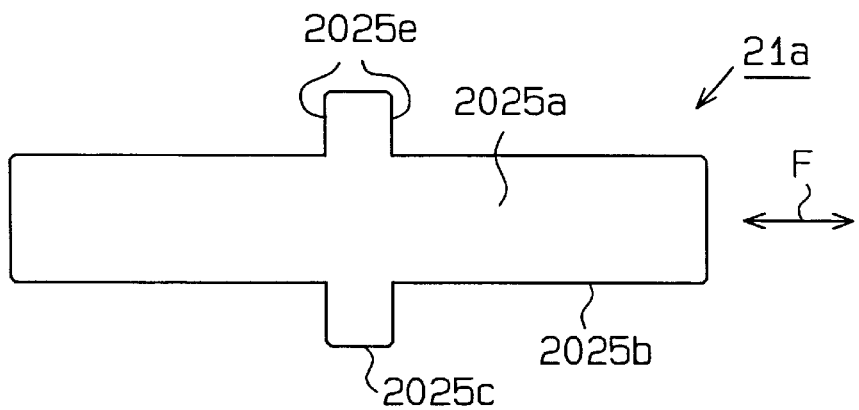
Figure 39:
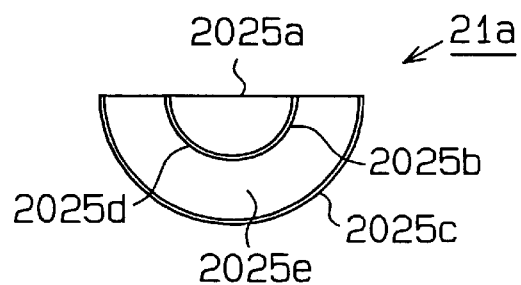
Figure 39:
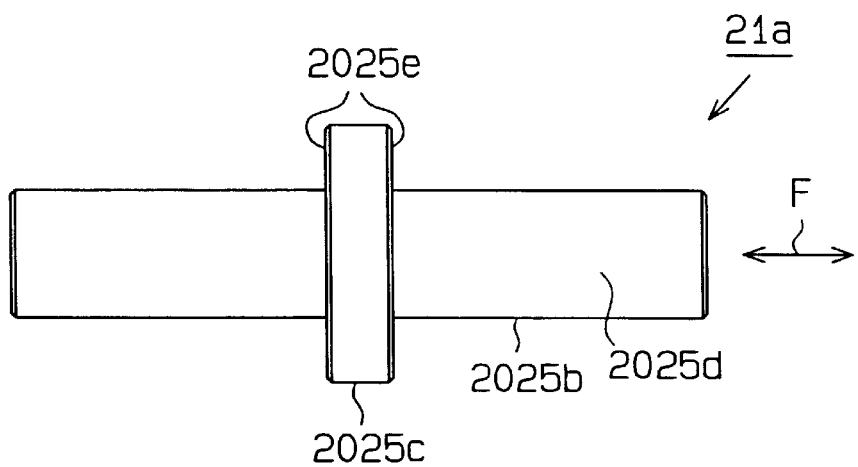

In the illustrated embodiments, a cam follower mechanism shown in FIGS. 38 and 39 may be employed. The mechanism includes a cylindrical valve lifter 2019. A guide projection 2019b is formed in the circumferential surface 2019a of the valve lifter 2019. The lifter bore 2019 is supported by and is axially moved relative to a lifter bore (not shown) formed in a cylinder head. The guide projection 2019b is fitted in a rectangular groove formed in the inner surface of the lifter bore along the axial direction of the lifter bore, which prevents the valve lifter 2019 from rotating.

A cam follower holder 2024 is integrally formed on the upper surface 2019d of the valve lifter 2019. A cam follower 21a is pivotally fitted in a guide groove 2024a formed in the cam follower holder 2024. The valve lifter 2019 is pressed against the cams 27, 28 by a compressed spring located between the cylinder head and the valve lifter 2019. Thus, a sliding surface 2025a of the cam follower 21a is pressed against a cam surface 2011a of the cam 27, 28, which causes the cam follower 21a to pivot in accordance with the cam surface 2011a.

As shown in FIGS. 39(A) and 39(B), the cam follower 21a includes a semi-cylindrical column 2025b and a semi-circular flange 2025c, which is located at the axial center, or at the center in the direction of arrow F, of the column 2025b. The circular surface of the column 2025b forms a sliding surface 2025d, which is slidably fitted in the guide groove 2024a of the cam follower holder 2024.

The flange 2025c is fitted in a flange groove 2024b formed in the axial center of the guide groove 2024a, which allows thrust surfaces 2025e of the flange 2025c to contact thrust surfaces 2024c of the flange groove 2024b. The contact of the thrust surfaces 2025e and 2024c prevents the cam follower 21a from moving in the direction of arrow F.

Figure 40:
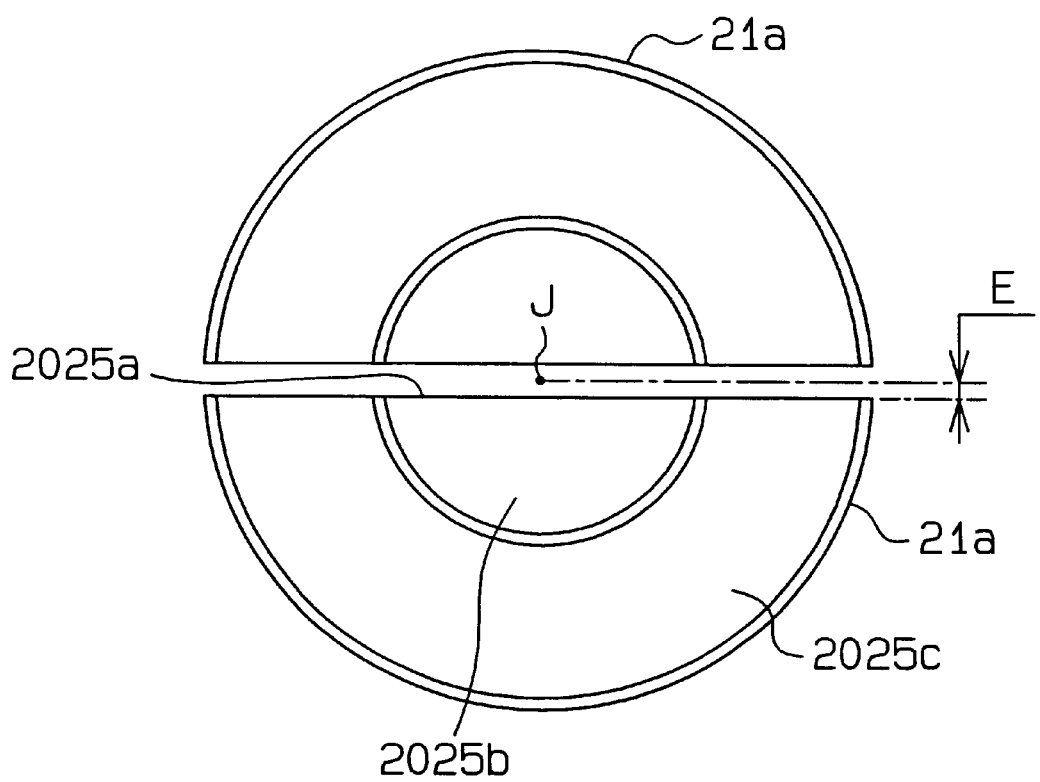
FIG. 40 is a diagrammatic view showing the characteristics of the cam follower shown in FIG. 39(A)

As shown in FIG. 40 (an enlarged drawing of FIG. 39(C)), the cam follower 21a is not a complete half cylinder. The sliding surface 2025a is offset from the radial center J of a circle defined by the cam follower 21a by a distance E. If the offset E is relatively small, there will be no problem with the functioning of the cam follower 21a compared to a case where there is no offset E. For example, if the offset is 0.3 mm, the resulting error in the valve lift will be 10 $\mu$m, which is very small, when the cam follower 21a is inclined by fifteen degrees in accordance with the cam surface 2011a. The error will be in the range of tolerance and will cause no problem.

Figure 41:
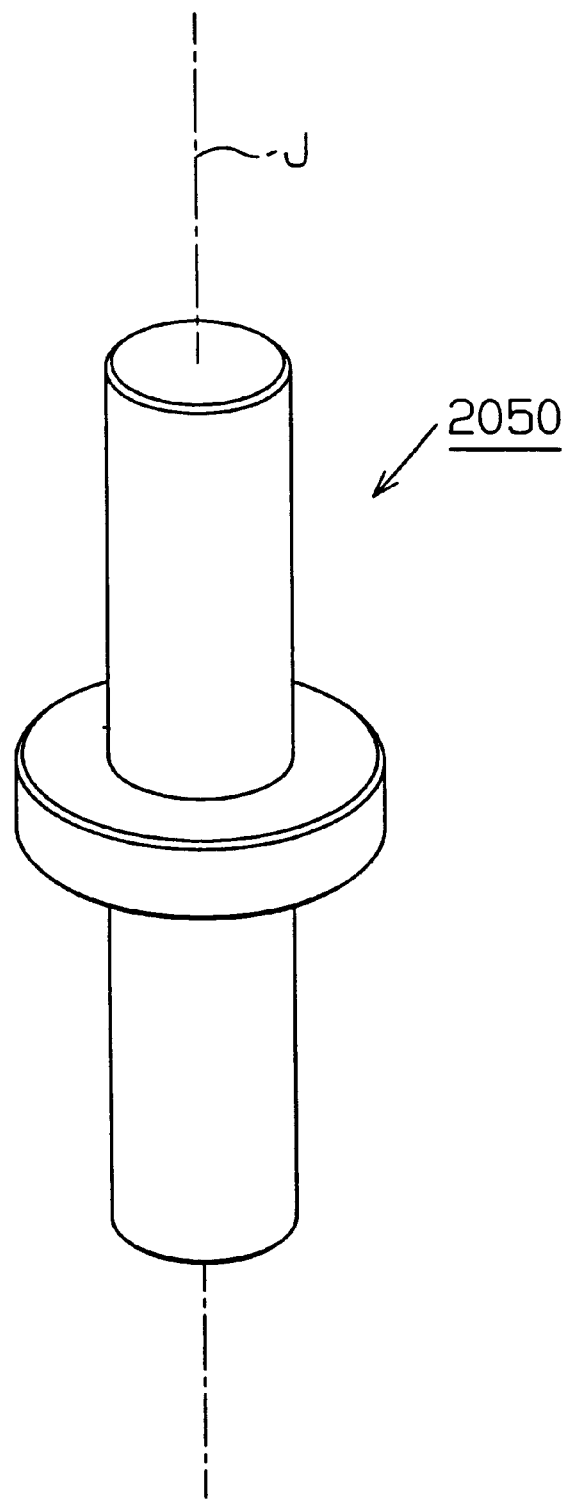
FIG. 41 is a perspective view illustrating an intermediate product when manufacturing the cam follower of FIG. 39(A).

When manufacturing the cam follower 21a, an intermediate product 2050 as shown in FIG. 41 is formed first. Then, the intermediate product 2050 is cut in half along a plane including the axis J shown in FIGS. 41 and 42. Thereafter, the cut surfaces are ground. As a result, two cam followers 21a are manufactured. In this manner, two cam followers 21a are easily manufactured. This manufacturing method has a high productivity and thus reduces the manufacturing cost. Further, compared to a method for manufacturing two complete semi-cylindrical cam followers, the illustrated method saves material.

The present examples and embodiments are to be considered as illustrative and not restrictive and the invention is not to be limited to the details given herein, but may be modified within the scope and equivalence of the appended claims.

What is claimed is:

1. A valve train for an internal combustion engine, comprising:

a variable valve performance mechanism including a three-dimensional cam having a profile that continuously changes in the axial direction, the variable performance mechanism continuously changing the valve open angle of an exhaust valve;

a controller for controlling the variable valve performance mechanism;

a sensor for detecting the running state of the engine; and a judging device for judging whether there is a malfunction in the engine based on a detection signal of the sensor, wherein when the judging device judges that there is a malfunction in the engine, the controller actuates the variable valve performance mechanism to retard the opening timing of the exhaust valve.

2. The valve train according to claim 1, wherein the variable valve performance mechanism includes:

exhaust and intake camshafts rotatably supported on the engine, the exhaust camshaft being axially movable; and a first actuator for axially moving the exhaust camshaft to change the valve open angle of the exhaust valve, wherein the three-dimensional cam is located on the exhaust camshaft to selectively open and close the exhaust valve.

3. A method for changing the valve performance of an exhaust valve by using a three-dimensional cam, the method comprising:

detecting the running state of an engine;

judging whether the engine is running normally based on the detected running state;

controlling a valve open angle based on the detected running state when the engine is judged to be running normally; and advancing the closing timing of the exhaust valve when the engine is judged to be running abnormally, wherein the profile of the three-dimensional cam continuously changes in the axial direction.

* * * * *